US011187794B2

(12) United States Patent
Mayor et al.

(10) Patent No.: US 11,187,794 B2
(45) Date of Patent: Nov. 30, 2021

(54) FLUID PRESSURE WAVEFORM GENERATOR AND METHODS OF USE

(71) Applicant: Reeves Wireline Technologies Limited, Leicestershire (GB)

(72) Inventors: Terence Paul Mayor, Nottingham (GB); Philip Botting, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 741 days.

(21) Appl. No.: 15/924,619

(22) Filed: Mar. 19, 2018

(65) Prior Publication Data
US 2018/0284248 A1 Oct. 4, 2018

(30) Foreign Application Priority Data

Mar. 31, 2017 (GB) .................................... 1705193

(51) Int. Cl.
*G01S 7/521* (2006.01)
*G01S 7/524* (2006.01)
*E21B 47/18* (2012.01)
*G01S 15/88* (2006.01)
(Continued)

(52) U.S. Cl.
CPC .............. *G01S 7/521* (2013.01); *E21B 47/18* (2013.01); *G01S 7/524* (2013.01); *G01S 15/88* (2013.01);
(Continued)

(58) Field of Classification Search
CPC .......... G01S 7/521; G01S 15/89; G01S 7/524; G01S 15/88; E21B 47/18; G01V 1/52; G01V 1/145; G01V 1/42; G01V 2001/526
See application file for complete search history.

(56) References Cited

U.S. PATENT DOCUMENTS 5,852,262 A   12/1998  Gill et al.
6,671,224 B1 * 12/2003  Pabon .............. G10K 11/17854
                                                    367/82
(Continued)

FOREIGN PATENT DOCUMENTS

EP       0246773 A2    11/1987
WO    2008/060233 A1    5/2008

OTHER PUBLICATIONS

Search Report in counterpart UK Appl. GB1705193.9, dated Jul. 11, 2017, 1-pg.
(Continued)

*Primary Examiner* — Yuqing Xiao
*Assistant Examiner* — Amie M Ndure
(74) *Attorney, Agent, or Firm* — Blank Rome LLP

(57) ABSTRACT

An acoustic dipole waveform generator has a hollow housing defining an elongate axis and having secured therein at least a force reaction member defining at least a force reaction surface and having hingingly secured thereto an actuator element. The piezoelectric actuator elements define mutually non-aligned length change axes and extend from the reaction member towards at least one moveable piston member hingingly secured to at least one of the actuator elements inside the housing. The piston member is constrained to move in a direction extending perpendicular to the axis, the piston member defining respectively at mutually spaced locations in the housing a pair of heads that, on movement of the piston member, each generate a respective pressure wave and the housing permitting transmission of the wave externally thereby permitting generation of a dipole pressure waveform externally of the housing on changing of the lengths of the actuator elements.

33 Claims, 13 Drawing Sheets

(51) Int. Cl.
  *G01V 1/145* (2006.01)
  *G01V 1/52* (2006.01)
  *G01S 15/89* (2006.01)
  *G01V 1/42* (2006.01)

(52) U.S. Cl.
  CPC ............ *G01V 1/145* (2013.01); *G01V 1/52* (2013.01); *G01S 15/89* (2013.01); *G01V 1/42* (2013.01); *G01V 2001/526* (2013.01)

(56) References Cited

U.S. PATENT DOCUMENTS

| | | | | |
|---|---|---|---|---|
| 7,039,524 B2* | 5/2006 | Haugland | ................ | G01V 1/48 702/18 |
| 7,334,661 B2* | 2/2008 | Pabon | ................... | E21B 47/017 181/108 |
| 8,195,398 B2* | 6/2012 | Lovell | ................... | E21B 47/103 702/6 |
| 8,299,795 B2* | 10/2012 | Hall | ......................... | G01V 3/28 324/339 |
| 9,952,344 B2* | 4/2018 | Chang | ...................... | G01V 1/46 |
| 2017/0168186 A1* | 6/2017 | Chang | ...................... | G01V 1/42 |

OTHER PUBLICATIONS

Ma, J. et al., "Joint Processing of Forward and Backward Extended Prony and Weighted Spectral Semblance Methods for Robust Extraction of Velocity Dispersion Data," 51st Annual Logging Symposium, Jun. 19-23, 2010, 13-pgs.

* cited by examiner

FLUID PRESSURE WAVEFORM GENERATOR AND METHODS OF USE

FIELD OF THE DISCLOSURE

The subject matter of the present disclosure relates to a fluid (acoustic) pressure waveform generator and methods of its use and can be of particular benefit in the field of downhole geological data logging, in which a logging device is inserted into a fluid-filled cavity typically in the form of a borehole or wellbore formed in a geological formation. The disclosed subject matter is in principle applicable both in logging-while-drilling (LWD) situations and in more conventional logging techniques.

BACKGROUND OF THE DISCLOSURE

Fluid pressure waveform generators are of utility in numerous situations in which it is required to generate fluid pressure patterns, pulses and wave trains in fluids. Such requirements arise in various fields. For example, fluid pressure waveform generators can be of particular benefit in the field of downhole geological data logging, in which a logging device is inserted into a fluid-filled cavity typically in the form of a borehole or wellbore formed in a geological formation.

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above.

Broadly stated, downhole logging involves inserting a logging tool including a section sometimes called a "sonde" into a borehole or other feature penetrating a formation under investigation; and in the majority of cases using the sonde to energize the material of the rock, etc., surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the lithology, concentration, quantity and a host of other characteristics of minerals in the vicinity of the borehole, as well as geological aspects that influence the ease with which the target mineral material may be extracted to a surface location.

Some logging takes place with respect to pre-drilled or otherwise pre-existing boreholes. It is however also known, and indeed increasingly commonplace, to log a borehole during the process of drilling it.

The logging tools generate signals (that often are, but need not necessarily be, electrical signals) as outputs. The thus-generated signals may, depending on the logging tool type, be stored in a memory operatively associated with the logging tool for downloading following retrieval of the logging tool from the borehole; or may be telemetered immediately or with a short delay to a surface location, before the logging tool is withdrawn from the borehole.

Various telemetry techniques are known. The most commonly used involves transmitting the signals, or analogues or derivatives of them, via an electrically conducting cable known as wireline.

Regardless of the exact data recovery methods used the resulting log data signals may be processed into logs that are numerical, graphical, tabular, database or image representations of the downhole rock conditions detected by the logging tool. In many forms of log (and especially those to which the disclosed subject matter pertains) the electrical (or other) signals associated with particular borehole depth and azimuth co-ordinates are used to influence e.g. the colors of pixels of a display device or printed log such that specific conditions at downhole locations are unambiguously mapped to particular colors, shading, lines and/or textures in the logs. The logs may be viewed by skilled interpreters or analyzed electronically in order to reveal data about the formation and the minerals such as but not limited to limestones, sandstones and dolomites contained in it.

Known logging devices adopt a variety of forms. When the logging device is such as to operate by developing a pressure waveform in the fluid that surrounds it e.g. downhole, it is frequently referred to as an acoustic or sonic logging tool or device. The term "acoustic" is used herein to indicate such logging tools and related devices and to which the disclosed subject matter pertains. The disclosed subject matter also may find application in other areas.

The disclosed subject matter additionally relates to methods of using such waveform generators, to logging tools and toolstrings including waveform generators as specified herein, and to various forms of log data and log information (typically but not necessarily derived from operation of such a waveform generator or logging tool/toolstring).

Waveform generators are employed both in surface (seismic) and downhole logging equipment. The disclosed subject matter relates especially to downhole logging, which is explained in more detail herein.

In the case of downhole acoustic logging the emitted energy usually is in the form of pressure pulses, with directionality specific to the application, developed in fluid (referred to as borehole fluid, i.e. typically a mixture of liquids and sometimes including suspended solids and/or gases) surrounding a logging tool that has been inserted into a borehole formed e.g. by drilling into the rock of the formation of interest. Sensors forming part of or associated with the logging tool detect the energy after it has traversed the rock of the formation and returned to the logging tool, and generate signals (that as noted normally are electrical signals) indicative of the parameters and characteristics of the returned energy. Analysts can learn information about the formation (and in the case of oil and gas field logging, especially the porosity) from calculations performed on parameters of the returned acoustic energy of the waveform after polarization and passage through the rock.

When carrying out acoustic logging as outlined above it is often desired to generate a dipole pressure waveform, as opposed to a monopole pressure pattern, in the borehole fluid.

Dipole acoustic sources are useful as they can be utilized directly to determine the shear (s) velocity of the formation, even when in a so-called "slow formation" i.e. when the shear velocity is less than the borehole fluid velocity (such that no refracted shear component is available from a monopole source). A desirable precaution in such situations however is that the source frequency must be sufficiently low to ensure the generated flexural energy travels at the low frequency asymptote of the dispersion curve.

The generation of such flexural waves, also sometimes referred to as dipole waves, however is associated with certain drawbacks as explained below.

Primary among these is that the output pressure of existing dipole waveform generators used in acoustic downhole logging tools is low compared to their monopole counterparts for a given source dimension.

The problem manifests itself to some extent in the use of all prior art dipole acoustic logging tools; but it is somewhat pronounced when attempts are made to generate acoustic logs of boreholes of very large diameter, those that penetrate formations with very low formation velocities, and those that extend horizontally, or predominantly horizontally. Low formation velocities also imply high attenuation.

In such boreholes the recorded acoustic log data contain high levels of acoustic noise. As explained below however it is not readily possible in prior art acoustic logging tools simply to increase the output amplitude in order to overcome noise in the generated log signals.

The output pressure for a simple dipole source is given by:

$$\text{Pressure}(r) = \left(\frac{\omega^2 * \rho * M}{4 * \pi * r * c}\right) * \cos(\varphi)$$

where:
P=pressure (Pascals)
M=Q*d
Q=surface velocity term=area*velocity
d=doublet separation (m)
ω=circular frequency=2*π*frequency (Hz)
ρ=fluid density=1000 kg/m3 for water
r=radial distance (m)
c=sound velocity in fluid (m/sec) and
cos(φ)=directivity term describing the dipole pressure pattern
(Source: "Underwater Acoustics and Sonar Systems" University of Birmingham Lecture notes, Chapter 4 (unpublished).)

The output pressure can therefore be increased either by increasing the area or surface velocity for a given target frequency.

For a given volume or space constraint, i.e. in which the area of the source cannot be increased, this leaves only the Q term as a means to increase the output, i.e. the local surface velocity.

Some known acoustic dipole sources employ piezoelectric bender bars as the basic elements generating pressure waveforms. The displacements of these cannot simply be increased in order to increase the energy of the waveform generator, since electric field and tensile limits prevent this.

Also known are electromagnetic transmitters, such as that described in publication no. U.S. Pat. No. 5,852,262. Magnetostrictive actuators have been proposed. Hoop designs are typically used only as monopole sources or as receivers. It is believed that some hoop designs have been proposed as dipole and quadrupole sources, but for reasons based on the physics of such shapes they are size-limited via the diameter, and if the natural frequency is too high, output is compromised.

The output frequency of the dipole source should match the borehole/formation properties likely to be encountered. In practice this requires a preferred source bandwidth encompassing usable acoustic energy over several kHz.

Overall it is desired to devise an alternative way of increasing the surface velocity, and hence the output pressure, of a dipole waveform generator that is useful in acoustic downhole logging devices and methods.

SUMMARY OF THE DISCLOSURE

In an embodiment disclosed herein, there is provided an acoustic dipole waveform generator comprising a hollow housing defining an elongate axis of the acoustic waveform generator and having secured therein at least a first force reaction member defining at least a first force reaction surface and having hingingly secured thereto a first length-changeable actuator element extending from the said first force reaction member towards at least one moveable piston member that is hingingly secured to at least one said actuator element inside the hollow housing, the piston member being constrained by one or more constraint members to move in a movement direction extending perpendicular to the elongate axis of the acoustic waveform generator, the piston member defining respectively at mutually spaced locations in the housing a pair of piston heads that, on movement of the piston member, each generate a respective pressure wave and the hollow housing permitting transmission of each said pressure wave externally of the acoustic waveform generator thereby permitting generation of a dipole pressure waveform externally of the hollow housing on changing of the lengths of the at least a first actuator element.

As understood herein the term "actuator element" is a reference to any of a range of actuator element types that are capable of undergoing (typically small) changes in length while exhibiting high stiffness. Examples of different suitable types include piezoelectric actuator elements, magnetostrictive actuator elements, magnetic shape memory alloys and electroactive polymers. Piezoelectric actuator elements presently are the most preferred type. The embodiments of the subject matter described herein are intended to operate using piezoelectric actuator elements as the preferred actuator type, although several of them readily could be modified to employ other actuator types.

An arrangement as defined above advantageously amplifies the motion of e.g. a piezoelectric or magnetostrictive element in the sense that the range of movement and the surface velocity of the piston forming part of the disclosed subject matter are significantly greater than the same parameters measured in the piezoelectric elements when considered in isolation. Such amplification as a result renders considerably more effective than previously the existing types of dipole acoustic logging tool. Viewed in one way this is because the increased output amplitude of the apparatus of the disclosed subject matter improves the signal-to-noise ratio compared with the prior art. This is a benefit in horizontal/predominantly horizontal (and other) boreholes as explained. A large signal-to-noise ratio is also advantageous in large boreholes and in so-called "slow" formations. A good signal-to-noise ratio moreover is desirable in very many other acoustic logging situations, over and above the specific ones discussed above.

Yet a further benefit of the amplified acoustic signal that the apparatus of the present disclosure produces is that the spacings between transmitter and receiver parts of an acoustic logging tool may be increased compared with the prior art. This in turn means that the depth of investigation (i.e. the distance the acoustic waveform penetrates the rock surrounding the borehole) may be increased compared with the prior art.

A signal-to-noise ratio estimate also varies according to the processing methods employed. For example semblance methods employed in the time domain to extract formation velocity may be deemed to be adequate. However dispersion methods commonly utilized to extract the underlying frequency-velocity relationship may be limited to narrow frequency ranges. Robust methods can help extract some usable data.

See for example: JOINT PROCESSING OF FORWARD AND BACKWARD EXTENDED PRONY AND WEIGHTED SPECTRAL SEMBLANCE METHODS FOR ROBUST EXTRACTION OF VELOCITY DISPERSION DATA, Jun Ma, Pawel J. Matuszyk*, Robert K. Mallan, Carlos Torres-Verdín, and Benjamin C. Voss, SPWLA 51st Annual Logging Symposium, Jun. 19-23, 2010 paper R.

As will be familiar to those of skill in the art in the dipole pressure waveform generated by the apparatus of the present disclosure one pole may be regarded as "positive" and the other as "negative".

The amplification effect in some but not all embodiments described herein derives from the fact that the e.g. piezoelectric or magnetostrictive actuator element(s) together with the piston member define a triangle (or in some cases a truncated triangle) of force-transmitting elements. In other embodiments of the present disclosure, described below, a trapezoidal or other quadrilateral arrangement of force-transferring elements is defined and has been found to give rise to similar amplification advantages to triangular devices.

Preferably the first length-changeable actuator element defines a length change axis; the angle a subtended between the length change axis and the movement direction is in the range 0<a<90 degrees; and in use the acoustic waveform generator generates a waveform that is amplified compared with movement of the first length-changeable actuator element by an amplification ratio that is, or is proportional to, 1/cos(a). As a result advantageously the amplification ratio (e.g. ×2, ×4, ×10, etc.) may be selected by a designer of apparatus according to the present disclosure, through choice of the angles subtended between the actuator element(s) and the piston, among other design parameters that may be varied in order to achieve desired output effects.

Also preferably the waveform generator of the present disclosure includes a first pair of e.g. piezoelectric or magnetostrictive actuator elements defining mutually non-aligned length change axes and extending from the said first force reaction member towards the at least one piston member, the at least one piston member being hingingly secured to the first pair of actuator elements.

When the waveform generator includes more than one piezoelectric actuator element, differential expansion of the piezoelectric elements may be effected through the use of differential driver voltages for the two piezoelectric elements, with the resulting movement of the piston member exhibiting an amplification effect compared with the length changes of the piezoelectric elements when considered on their own.

When herein references are made to a pair of e.g. piezoelectric or magnetostrictive elements it is typically expected that both elements of the pair would be of the same general type, i.e. piezoelectric or magnetostrictive. Potentially however the members of such a pair may differ from one another such that one may be piezoelectric and the other magnetostrictive.

When, as will be the case in the majority of embodiments disclosed herein, at least one pair of elements of the same general type are provided it usually will be the case that the two elements constituting the pair are identical or closely similar to one another. However in some embodiments of the present disclosure the elements of the pair may differ significantly (e.g. as to dimensions, contraction/extension ratios, power outputs and so on) from one another even if they are of the same general type.

The use of piezoelectric or magnetostrictive actuator elements means that the performance of the present disclosure is superior to a prior art piezo-ceramic bender bar arrangement.

This is because a piezo-ceramic element in use bends with the result that it is subjected simultaneously to tensile and bending stresses. These can cause cracking of the ceramic. Any attempt at preventing or minimizing such cracking results in limiting of the device output. Moreover in contrast to the piezoelectric actuator elements the known designs of bender bar cannot easily be pre-loaded to avoid the tensile stress; and the maximum displacement of a bender bar occurs only at its mid-point, with necessarily no displacement at its ends. These factors are disadvantages of prior art arrangements.

The waveform generator of the present disclosure as stated and implied herein offers superior amplification and signal-to-noise performance to prior art piezoelectric bender bar designs.

In addition to the foregoing, the hinging connection of the actuator elements to the piston member and the first force reaction member means that relative rotational movement between these parts, as derives from the differential elongation of the actuator elements, may readily be accommodated.

Conveniently the waveform generator of the present disclosure includes a first pair of e.g. piezoelectric or magnetostrictive actuator elements defining mutually non-aligned length change axes and extending from the said first force reaction member towards the at least one piston member, the at least one piston member being hingingly secured to the first pair of actuator elements. This arrangement advantageously is present in the majority of practical embodiments of the present disclosure; but as implied above and explained below it is also possible to embody versions of the present disclosure in which only a single (typically piezoelectric) actuator element is employed.

In one optional embodiment the one or more constraint members include a pair of mutually spaced apart rigid arms that are each hingingly secured respectively to the piston member and the first force reaction member whereby to limit movement of the piston member to a predetermined direction, preferably but not necessarily perpendicular to the elongate axis of the acoustic waveform generator.

This arrangement is advantageously simple since it employs pantograph-like arms that may be straightforwardly attached to the piston member in order to constrain its movement to a direction that as mentioned in many but not all embodiments of the present disclosure is perpendicular to the elongate axis of the dipole waveform generator. In turn this leads to an efficient transmission and amplification of the movement of the first pair of piezoelectric, etc., elements. Even in embodiments in which the direction of movement of the piston is not perpendicular to the aforesaid elongate axis the movement of the piston generally is such as to create a dipole pressure pattern in fluid surrounding the logging tool, the dipole axis of which is perpendicular to the elongate axis.

Optionally when considered with reference to the direction extending perpendicular to the elongate axis of the acoustic waveform generator the mutually spaced apart rigid arms lie outwardly of the actuator elements. However in other embodiments the actuator elements could lie outwardly of the rigid arms; or the actuator elements and the rigid arms could be arranged in an alternating pattern extending from one side of the interior of the hollow housing to the other.

For the avoidance of doubt, references to the relative positions of parts of the waveform generator of the present disclosure are not limited to arrangements in which the parts are in a common plane. The exemplary embodiments described herein illustrate such common-plane arrangements but these can readily be reconfigured within the scope of the present disclosure such that multi-plane embodiments result. Moreover it is possible to devise numerous additional common-plane and multi-plane embodiments of the present disclosure.

Generally, embodiments described herein are workable if the waveform generator includes one or more piezoelectric, magnetostrictive or other (as exemplified herein) actuator elements arranged such that the length change of the or each actuator element acts at an angle to the direction of movement of the piston, which latter is constrained so that on movement the piston generates a dipole pressure pattern the axis of which extends perpendicular to the elongate axis of the waveform generator. The constraint acting on the piston may take any of a range of forms, including active links (such as controllably length-changing elements), passive links (such as rigid, hingingly secured members), flexible members (such as springs), e.g. rigid parts of housings or other structural elements of logging tools or waveform generators, or combinations of such elements. For convenience several of the exemplary embodiments described herein employ rigid arms as the constraint, but in many such embodiments the rigid arms may be substituted by other types of constraint as aforesaid. Moreover in the presently most preferred embodiments described herein, active links are employed. Other arrangements are also possible within the scope of the present disclosure. The arrangements within the scope of the present disclosure may include sliding or rolling linear bearings, or other bearing types, to cater for movement between subcomponents of the present disclosure.

Conveniently the acoustic dipole waveform generator described herein includes a second force reaction member defining at least a second force reaction surface that is spaced from the first force reaction surface inside the hollow housing and lies on the opposite side of the piston member to the first force reaction surface.

The provision of a second force reaction member, which may be the same as or similar to the first force reaction member, or different therefrom, defining at least a second force reaction surface advantageously means that the constraining force and the actuator force that act on the piston member may be distributed within the dipole waveform generator. This in turn means that if desired all the links can be of the "active" type; and they can be pre-loaded in compression (which as explained herein is an advantage). Moreover the presence of a second reaction surface means the components of the waveform generator can readily be fitted inside an elongate logging tool housing, with the pressure wave output generated at right angles to the tool axis. In other words the constructional arrangement of the present disclosure allows to take advantage of the design freedom in the length direction of an elongate logging tool in a way that avoids the constraints inherent in the radial dimensions of such a tool, and also that is in line with preferred requirements with regard to the resonant frequency of the device as discussed further below.

More specifically, with regard to the arrangement of the constraint members, optionally the one or more constraint members includes a pair of mutually spaced apart rigid arms that are each hingingly secured respectively to the piston member and the second force reaction member whereby to limit movement of the piston member to a direction perpendicular to the elongate axis of the acoustic waveform generator. As a result the second force reaction member, the rigid arms, the piston member and the actuator elements may readily and conveniently define a pair of trapezoids, truncated triangles (or other quadrilaterals); or triangles of force-transferring members, disposed respectively on opposite sides of the piston member. This gives rise to an advantageously stable arrangement that operates effectively to constrain the movement of the piston member to a path that efficiently generates dipole pressure patterns.

In an alternative, and presently most preferred, embodiment however the one or more constraint members optionally includes a second pair of actuator elements defining mutually non-aligned length change axes and each hingingly secured respectively to the piston member and the second force reaction member whereby the first and second pairs of actuator members limit movement of the piston member to a direction perpendicular to the elongate axis of the acoustic waveform generator and permit generation of a dipole pressure wave externally of the hollow housing on changing of the lengths of the first and second pairs of actuator elements along the length change axes.

In such an embodiment the piston member may be driven from two opposed sides such that the pairs of actuator elements act simultaneously both as actuators and as force constraints. This further is advantageous compared with arrangements that include "passive" link elements. These contribute to the mass requiring to be moved in the waveform generator, without increasing stiffness in the axis of piston motion. As a result arrangements including passive links (i.e. link elements that are merely reactive and cannot be powered to change length or position) generally produce lower amplitude and/or frequency outputs than embodiments including active link elements. For the avoidance of doubt however it should be understood that numerous embodiments of the present disclosure include at least some passive links as described herein.

Conveniently the second piezoelectric actuator elements are mutually divergent when considered in a direction from the second force reaction member to the piston member. Thus the force-transferring arrangement indicated above may be defined in a stable and effective manner.

Alternatively however the second actuator elements may in some embodiments be mutually convergent when considered in a direction from the second force reaction member to the piston member. This arrangement also defines a trapezoidal, other quadrilateral or triangular force-transferring arrangement that takes advantage of differential elongation of the piezoelectric elements in order to cause amplified movement of the piston member.

In like manner to the second elements, when these are present, optionally the first actuator elements are mutually divergent when considered in a direction from the first force reaction member to the piston member; or alternatively the first actuator elements may be convergent in the direction towards the piston member. Similar advantages to those outlined above in relation to the second actuator elements inure to the first actuator elements in these arrangements.

In a preferred embodiment the first force reaction member includes integral therewith or secured thereto a pair of first force reaction surfaces and each of the first pair of piezoelectric actuator elements is hingingly secured to a respective said first force reaction surface. In more detail, the first force reaction surface may be, or may include, respective first and second arcuate (e.g. part-spherical) protuberances and the actuator elements may be formed including arcuate (e.g. part-spherical) recesses in which the protuberances are hingingly received. The protuberances may be defined as parts of respective force pre-compression members that are position-adjustably (e.g. by means of screw threads) received in or relative to a fixed member, such as a plug or other rigid member spanning the interior of a housing forming part of the waveform generator.

The ends of the force pre-compression members that are remote from the actuator elements may be accessible e.g. via apertures formed in the fixed member and may include screw heads. By such means it is possible to adjust the positions of the protuberances of the force pre-compression members relative to the fixed member and thereby select the degree of pre-compression acting on the actuator elements.

The arrangement of the first force reaction members and the hinging connection of the actuator elements may be reversed in the sense that the protuberances may be formed on the actuator elements (e.g. at their ends) and the recesses formed in the first force reaction surface (e.g. at the ends of force pre-compression members). Either described arrangement of the first force reaction members beneficially allows the force reaction surfaces to react the forces transmitted via the first piezoelectric actuator elements in an efficient way.

Similarly when it is present the second force reaction member includes formed integrally therewith or secured thereto a pair of second force reaction surfaces and each of the second pair of actuator elements is hingingly secured to a respective said second force reaction surface. The arrangement of the second force reaction surfaces and the associated actuator elements may be similar or identical to that described above in relation to the first force reaction surfaces, or it may differ therefrom.

In one disclosed embodiment the cross-section of the piston member is constant along the length of the piston member. In an alternative embodiment however the cross-section of the piston member is non-constant along the length of the piston member; and in particular the cross-section of the piston member reduces towards the mid-point of the length of the piston member whereby to define at least a first pair of mutually skewed piston surfaces to which the first pair of actuator elements are respectively secured. The last-mentioned arrangement allows the piston member to react the forces applied via the actuator elements essentially as normals over the major part of the hinging motion of the actuator members relative to the piston member. This is stable and efficient, for reasons similar to those explained above.

Reducing the cross section of the piston member also beneficially reduces the mass of it. This in turn may assist a designer to tune the natural frequency of the waveform generator of the present disclosure.

When the dipole acoustic waveform generator of the present disclosure includes a second pair of actuator members as aforesaid the piston member optionally may define a second pair of mutually skewed piston surfaces to which the second pair of actuator elements are respectively secured. Advantages of this second pair of mutually skewed piston surfaces are similar to those of the first pair of piston surfaces mentioned above.

In one preferred embodiment disclosed herein the natural frequency of the dipole acoustic waveform generator following mass-loading and installation in an oil-filled housing is in the approximate range 500 Hz-3 kHz and in one particularly preferred embodiment is approximately 1.6 kHz. Adjustment of the amount of compressive pre-loading of the actuator elements as described above may be used as an additional means to control the natural frequency within limits determined by various parameters of the device.

Regardless of the detailed arrangement of the various surfaces and piezoelectric actuator elements, preferably the hollow housing includes a window adjacent each piston head, each said window being closed by a flexible or moveable closure that prevents the passage of fluid while permitting transmission in surrounding fluid of a pressure waveform caused by movement of the piston member inside the hollow housing. In a practical embodiment of the present disclosure a single sleeve that encircles the hollow housing over part or all of its length may define the flexible or moveable closure of each of the windows.

Such a mechanism beneficially means that any dipole pressure wave generated in the surrounding borehole fluid through movement of the piston inside the hollow housing is transmitted externally of the waveform generator, via the borehole fluid.

For the avoidance of doubt it is here stated that in many useable embodiments the hollow housing is fluid-tight and defines an internal space containing an oil and outside which one or more pressure waveforms is formable on movement of the piston member inside the hollow housing. The internal oil is desirable in practical downhole devices to balance borehole pressure and thereby stop sleeves/windows/the structure generally collapsing.

The subject matter of the present disclosure is considered further to reside in an acoustic dipole waveform generator according to any embodiment hereof or as otherwise defined herein in accordance with the present disclosure when constituted as or forming part of a downhole logging tool or toolstring.

The terms "downhole logging tool" and "downhole logging toolstring" will be familiar to the person of skill in the art and are used herein in their recognized senses.

The present disclosure further resides in an acoustic dipole waveform generator according to the present disclosure as defined herein including operatively connected thereto a driver that is capable of energizing at least the first pair of actuator elements such that one of them extends along a length change axis and the other contracts along a length change axis in order to cause amplified movement of the piston member in a direction perpendicular to the elongate axis of the acoustic waveform generator.

As noted, in basic embodiments described herein a single actuator element is possible but in preferred embodiments at least a first pair of actuator elements is employed.

The driver may take a range of forms as will occur to the person of skill in the art. Preferably the driver includes an electrical or electronic circuit that is electrically connected to a said or each pair of actuator elements that in such embodiments are piezoelectric actuator elements and is capable of generating electrical signals that energize at least the first pair of actuator elements. The term "electrical circuit" includes within its scope e.g. printed circuits, micro-electronic and/or semiconductor control elements and/or circuits, integrated circuit chips and packages and variants thereof, again as will be known to the person of skill in the art. Other forms of driver as will be within the knowledge of the scope of the person of skill in the art are also within the scope of the present disclosure.

In a further embodiment disclosed herein there is provided a method of generating a dipole waveform in a fluid comprising the steps of: a. immersing an acoustic dipole waveform generator according to the present disclosure as defined herein in the fluid; b. causing a differential change in length, along a respective length change axis, of the members of at least a first actuator element thereby causing movement of the piston member in a direction perpendicular to the elongate axis of the acoustic waveform generator and generating a dipole pressure waveform in the fluid.

Such a method advantageously may be practiced using apparatus according to the present disclosure.

Preferably the disclosed method includes the steps of: c. causing contraction, along a said length change axis, of one of the at least a first pair of actuator elements; and d. simultaneously causing extension, along a said length change axis, of the other of the at least first pair of actuator elements.

Also preferably the method includes the further step of, before Step a., applying a compressive preload to the (or each) actuator element.

In a further broad aspect there is disclosed herein a method of acquiring log data on a subterranean formation including the steps of: e. inserting an acoustic dipole waveform generator according to any of the embodiments hereof into a fluid-filled cavity in the subterranean formation; f. operating the acoustic dipole waveform generator to generate a dipole pressure wave in the fluid filling the cavity such that the pressure wave permeates the formation; g. at a location remote from the acoustic dipole waveform generator, operating two or more sensors of pressure energy to generate one or more log signals characteristic of the pressure wave after it has permeated the formation.

Typically such sensors are aligned in the plane of the dipole source, and the method of the present disclosure includes the step of causing this to be the case.

Preferably the cavity is or includes a borehole formed in the formation.

In practical embodiments of the present disclosure each of the foregoing methods may include the further step of processing the log signals into a geological log in numerical, tabular, database, graphical or image log form. The thus processed signals, and/or any log data signals generated using the dipole acoustic waveform generator of the present disclosure, preferably are or include one or more electrical, optical and/or acoustic signals. When presented in a graphical or other optically detectable form they may be mapped to colors, lines and/or shading corresponding to particular values of attributes of the formation, for the purposes of e.g. printing, or display via a display device. In the latter case the signals may at differing times and/or when adopting different values activate, correspond to or be represented by specific pixels of a display device such as but not limited to a computer screen.

The scope of the present disclosure additionally extends to log data and/or a geological log acquired or created using an acoustic dipole waveform generator according to the present disclosure as defined herein; and/or log data and/or a geological log acquired or created by practicing a method according to the present disclosure as defined herein.

The present disclosure by creating an amplified dipole acoustic logging source output offers numerous advantages over the prior art. Primary among these is the improved signal-to-noise characteristic referred to above compared with the prior art.

Logging techniques are employed throughout mining industries, and also in particular in the oil and gas industries. The present disclosure is of benefit in acoustic logging activities potentially in all kinds of mining and especially in the logging of reserves of oil and gas. The present disclosure also is of benefit in acoustic logging for the purpose of identifying subterranean sources of water. For the avoidance of doubt the present disclosure is useable with and may form part of the logging tool types outlined above.

For clarity as used herein the term "depth of penetration" and derivative terms relates, as stated, to the extent to which logging tool energy permeates outwardly from an energy source forming part of a logging device into rock; and "logging depth" and derivative terms relates to the distance along a borehole towards its total depth at which a logging activity takes place.

In the remainder of this description the term "piezoelectric actuator element" is used to refer to actuator elements in specific embodiments of the present disclosure. As implied elsewhere herein however piezoelectric actuator elements could be replaced by magnetostrictive actuator elements or other actuator elements that may be powered or otherwise caused to extend and/or contract instead, if necessary following consequential alteration of aspects of the embodiments of the present disclosure. In other words although there are differences between e.g. piezoelectric and magnetostrictive, etc., actuator elements, in the context of the present disclosure they may be regarded as sufficiently similar as to be interchangeable in many embodiments. The terminology used herein is intended to embrace all such actuator element variants as the skilled reader may expect to be viable in embodiments within the scope of this disclosure.

Further for the avoidance of doubt references herein to boreholes is to elongate cavities penetrating rock formations. Principally such cavities are made by operating a drill, but may be made in a variety of other ways or in some cases they may form naturally. It is not essential or, in some cases, even likely, that such a borehole extends vertically downwardly into the rock. On the contrary, such a borehole may be variously orientated, may be horizontal or gently inclined over part or all of its length, and is unlikely to be of constant cross-section along its length. The present disclosure relates to all variants as are useable in boreholes as described.

BRIEF DESCRIPTION OF THE DRAWINGS

There now follows a description of preferred embodiments of the present disclosure, by way of non-limiting example, with reference being made to the accompanying drawings in which.

DETAILED DESCRIPTION OF THE DRAWINGS

Figure 1:
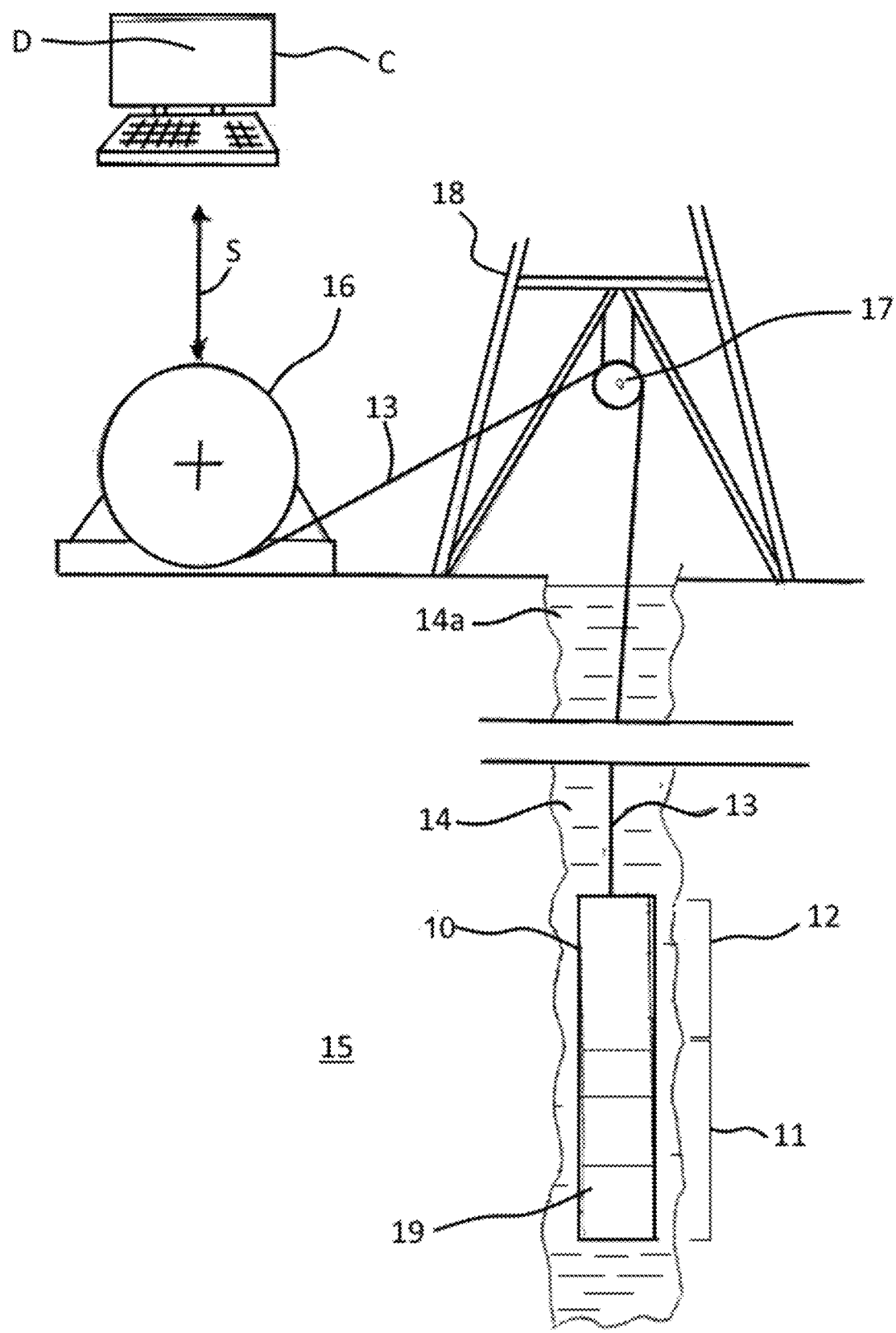
FIG. 1 is a schematic view of a logging operation in which a logging tool according to the present disclosure is in use to log a borehole.

Referring to the drawings in FIG. 1 there is shown a typical acoustic logging operation. In this a logging toolstring 10 including an acoustic emitter section or sub 11 and an acoustic receiver section or sub 12 is supported on wireline 13 in a per se known manner.

The logging toolstring 10 may include other subs in addition to those shown.

As is known in the art, wireline is armored cable that serves the twin purposes of (a) supporting the logging toolstring 10 such that it may be deployed into a borehole 14 and withdrawn therefrom; and (b) permitting the transmission of electrical signals between the surface location and the logging tool, and vice versa. The transmitted signals may be e.g. commands that cause the logging tool to behave in a desired fashion; or data signals e.g. corresponding to data values logged during operation of the logging tool or indicative of the status of the logging tool.

In FIG. 1 the distinction between the emitter section 11 and the acoustic receiver sub 12 is signified by a dotted line. This however is a purely schematic representation. In practice the division between the two sections of the logging tool may appear differently than as shown in FIG. 1, or may not be apparent at all e.g. because the parts of the logging toolstring all lie within a common cylindrical housing.

If the borehole 14 extends downwardly so as to be generally vertical or near-vertical the deployment of the logging toolstring 10 may take place through the action of gravity, with the wireline 13 being paid out, via e.g. a travelling block/pulley arrangement 17 supported on a derrick 18 or similar structure, from a drum 16 located at a surface location as deployment occurs. The logging toolstring 10 may then be retrieved to the surface location by winding the wireline 13 onto the drum 16, pulling the logging toolstring out of the borehole 14 in the process. The logging tool is operated to detect parameters of the rock 15 surrounding the borehole during such withdrawal, the detected parameters being recorded either in the logging tool or at a surface location as log data that may be processed as signals or in other ways.

In FIG. 1 such signals, which may take any of the forms described herein or further forms as will occur to the person of skill in the art, are schematically represented by arrow S, which shows them being transmitted to a processing device in the form of exemplary, non-limiting computer C.

Computer C includes display screen D by means of which logs derived from the signals generated by the logging toolstring may be displayed following analysis and/or processing using the computer C.

Electrical signals are the most common type of the signals generated by the toolstring 10. The person of skill will be aware that the computer C may be augmented or replaced by a range of other processing devices, including but not limited to one or more memory devices, circuitry and/or programmable elements forming part of the toolstring 10 or remote therefrom. Furthermore the wireline 13 may be dispensed with and alternative means employed for deploying and retrieving the toolstring 10 and handling the log data it generates. It is possible within the scope of the present disclosure for the logging toolstring 10 to be self-powered and to include a memory for at least temporarily storing log data for subsequent downloading following retrieval of the toolstring 10 to a surface location. In such a case deployment and retrieval of the logging toolstring may be effected e.g. by pumping using pumped borehole fluid as is familiar to the person of skill in the art.

In other arrangements within the scope of the present disclosure the operative parts of the logging toolstring 10 may be elements of a drillstring or other downhole assembly. In addition the sub-components of the logging toolstring 10 do not have to be joined together or integral with one another as illustrated; and instead may be spaced apart in the downhole environment. There is also the possibility of using "slickline", that is a wireline—with no inner electrical wires to enable communication. In this arrangement data also is logged into memory forming part of the logging tool, or may be telemetered using non-wired communications methods as are familiar to the person of skill in the art.

In other situations than that of FIG. 1 the inclination of the borehole may be insufficiently downwardly directed over part or all of its length to permit gravity deployment. In such a case one of a number of available techniques for positively driving the logging toolstring 10 into the borehole 14, such as but not limited to pumping techniques as mentioned above, may be employed before withdrawal and logging take place.

As a generality the logging toolstring 10 is deployed to a chosen depth along the borehole before logging operations commence. As mentioned logging then takes place typically while the logging toolstring is withdrawn towards the surface at which the drum 16 is located.

The borehole 14 typically is filled with borehole fluid 14a. This may have a wide variety of compositions and may be a mixture of naturally occurring and deliberately introduced liquids, including various chemicals that may be introduced into the borehole 14 in order to achieve particular effects. Such chemicals may be dissolved in the borehole fluid 14a or present as suspensions or other solid or semi-solid forms. The borehole fluid 14a also may include two or more immiscible fluids such as liquids of differing densities.

The borehole fluid 14a may include various naturally arising or deliberately introduced gases. Normally the borehole fluid 14a predominantly is liquid however.

As explained above the basic requirement in acoustic logging is for the emitter sub 11 to generate a chosen pressure waveform in the borehole fluid 14a such that the pressure wave transmits to the rock 15. The pressure wave then travels in the rock 15 and is detected at the receiver sub 12 by acoustic energy detectors such as so-called hydrophones, the nature of which is known in the art, forming part of the receiver sub 12. Calculations and other analyses may be performed on the data signals resulting from activation of the hydrophones in order to determine properties of the rock 15.

The action of the pressure wave acting on the borehole rock 15 may lead to the generation of one or more trapped modes depending on the source patterns that travel along the borehole 14 in both directions. For example a monopole source would preferentially generate a zero-th order borehole mode referred to in the art as a Stoneley wave. The waveform generator of the present disclosure, utilizing a dipole source, generates a flexural wave (circumferential order 1). In addition, and depending on the frequency content of the source, some acoustic energy will be reflected, transmitted and refracted or otherwise partitioned into various body modes such as compressional and refracted shear during use of the apparatus.

The receiver sub 12 is spaced from the emitter sub 11 in the longitudinal direction of the borehole 14. One mode of operation of an acoustic logging tool as illustrated involves generating an acoustic dipole pressure pattern as outlined above in the borehole fluid 14a, and determining the difference in time taken for the various energy components mentioned above to travel from the emitter sub 11 via the rock 15 to the receiver sub 12. Based on such difference measurements, and taking account of other known parameters such as the properties of the borehole fluid 14a, it is possible to establish the slowness of the rock formation 15, when the formation slowness is equal to the reciprocal of the formation velocity (and is usually stated in units of microseconds/meter, or micro-seconds/foot) and hence obtain an indication of its porosity, or infer the various elastic moduli of the rock. Other assessments and processing of the signals generated in the receiver sub 12 may also be carried out, and the use of the present disclosure is not limited to the calculation of slowness, that is described for illustration only.

The emitter sub 11 includes an exterior housing 19 defining a hollow interior. Located within the hollow interior is a waveform generator that may form part of the present disclosure. As mentioned it frequently is desirable for the waveform generator to generate a dipole waveform in the borehole fluid for transmission into and through/along the rock 15. Also as mentioned, various constraints limit the energy that existing, known waveform generators are capable of imparting in the dipole waveforms. The present disclosure optionally includes principally a waveform generator that is capable of generating high energy dipole waveforms and may be incorporated in an emitter sub such as sub 11, inside the hollow interior.

Figure 2:
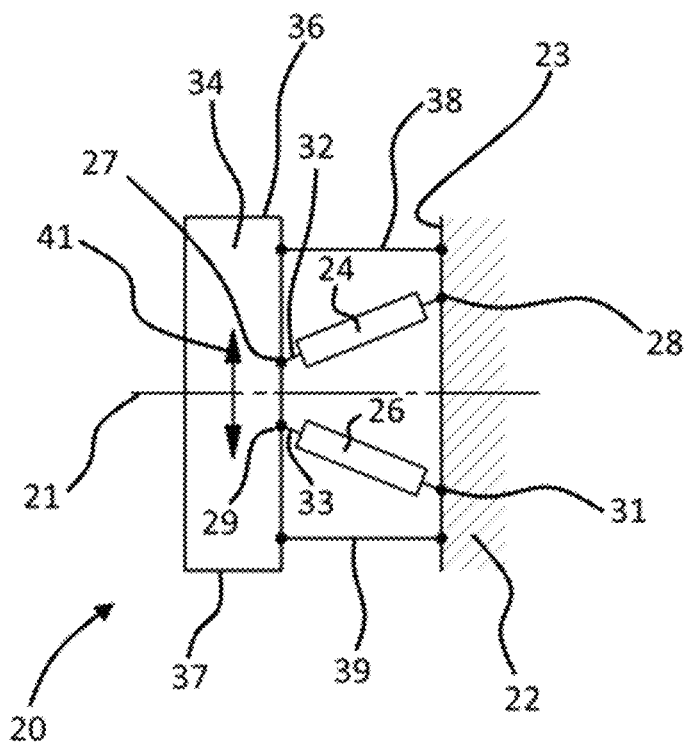
FIG. 2 shows in schematic view a first embodiment of an acoustic dipole waveform generator according to the present disclosure.

FIG. 2 shows in schematic form the basic components of one embodiment of acoustic dipole waveform generator 20 according to an embodiment.

FIG. 2 for ease of illustration omits the hollow housing 19 that normally forms part of an emitter sub, with the result that FIG. 2 shows only the parts of the acoustic dipole waveform generator 20 that lie within the hollow interior of the housing 19 in normal use. The elongate axis 21 of the dipole waveform generator 20 that is normally defined by the housing however is visible in the figure as a superimposed chain line.

The dipole waveform generator 20 includes a first force reaction member in the form of preferably floating mass member 22 that is retained by a semi-rigid fixing the stiffness of which is chosen by the designer of the waveform generator inside the hollow interior at or near one end thereof. In alternative, presently less preferred, embodiments, mass member 22 may be rigidly fixed inside the hollow interior defined by housing 19.

Floating mass member 22 defines planar force reaction surface 23 that in the embodiment of FIG. 2 is a flat, circular surface of approximately the same area as the cross-section of the hollow interior. The force reaction surface 23 extends perpendicular to the elongate axis 21. The mass member 22 may be manufactured e.g. by machining from a suitable metal blank, or in a range of other ways.

A pair of elongate piezoelectric actuator elements 24, 26 each terminates in a respective hinge connection 27, 28, 29, and 31 at each end. The piezoelectric actuator elements 24, 26 extend generally in the direction of the axis 21, but as described below are not parallel to it.

The detailed construction of the piezoelectric actuator elements 24, 26 will be known to the person of skill in the art.

In more detail a piezoelectric actuator stack is typically a ceramic construction, composed of many thin piezoceramic layers which are connected in parallel electrically to give a multiplicative dimensional movement, whilst allowing activation by means of a (relatively) low voltage.

The piezoelectric actuator elements 24, 26 additionally include such electrical connections as are needed for connecting them to a driver circuit also as described below. The electrical connections are omitted from FIG. 2 but may be readily embodied by the person of skill in the art.

At the hinge connections 28, 31 at the right hand end the piezoelectric actuator elements 24, 26 are hingingly secured to the force reaction surface 23, respectively on either side of the elongate axis 21 of the acoustic dipole waveform generator 20.

The elongate axis of each of the piezoelectric actuator elements 24, 26 is herein designated the length change axis 32, 33 of each of the elements 24, 26 since this is the dimension of each element 24, 26 that may be caused to lengthen or, in some operational modes, shorten in dependence on a voltage applied by the driver circuit.

As is shown in FIG. 2 the length change axes 32, 33 of the piezoelectric actuator elements 24, 26 are not mutually aligned and instead converge towards a piston member 34 extending transversely relative to the elongate axis 21.

The piston member 34 is mounted inside the interior of the hollow housing so as to be moveable perpendicular to the elongate axis 21. The preferred means by which such mounting is achieved is described further herein.

The hinges 27, 29 of the piezoelectric actuator members 24, 26 at the opposite ends to hinges 28, 31 are hingingly secured to the side of the piston member 34 that faces the surface 23. By reason of the convergent nature of the length change axes 32, 33 the hinges 27, 29 are closer together on the surface of the piston member 34 than are the hinges 28, 31 on the force reaction surface 23. A length of the force reaction surface 23, the piezoelectric actuator elements 24, 26 and a length of the side of piston member 34 as a result define a trapezoidal or truncated triangular network of force-transferring members.

Figure 6:
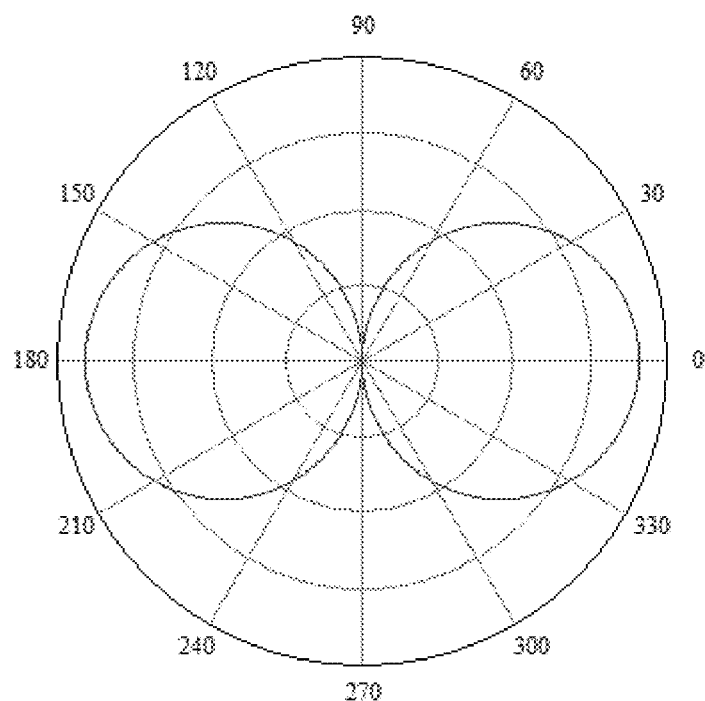
FIG. 6 shows an example of a pressure pattern that may be induced in borehole fluid and surrounding rock using apparatus according to the present disclosure.

At each end the piston member 34 defines a respective piston head 36, 37. On movement of the piston transverse to the elongate axis as described herein the piston heads 36, 37 generate pressure in the borehole fluid 14a by contacting a rigid sleeve (or a section of the housing 19) encircling the components visible in FIG. 2. This in turn results in the generation of pressure waveforms externally of the housing 19, by reason of movement of the sleeve or the flexible section of the housing 19 in the borehole fluid relative to the remainder of the waveform generator 20. The nature of such waveforms may be determined through choice of the movement of the piston member 34 caused by appropriately chosen voltages applied to the actuator elements 24, 26. One non-limiting example of a pressure waveform that may be generated using apparatus according to the present disclosure is illustrated in FIG. 6.

Constraining of the movement of the piston member 34 to a direction perpendicular to the elongate axis 21 is achieved through the use of constraint members in the form of mutually spaced apart rigid arms 38, 39, that cause the otherwise arcuate movement of piston member 34 to approximate to a linear movement over the small range of motion experienced by the member 34.

The rigid arms 38, 39 are hingingly secured respectively at each end to the side of the piston member 34 and the force reaction surface 23. The rigid arms 38, 39 in the embodiment of FIG. 20 lie outwardly of the piezoelectric actuator elements 24, 26 when judged relative to the elongate axis 21, although in some alternative embodiments the piezoelectric actuator elements 24, 26 may be positioned outwardly of the rigid arms 38, 39. The rigid arms may be made from a suitable stiff material such as a steel or e.g. another metal.

As a result of this arrangement any differential change in the lengths of the piezoelectric actuator elements 24, 26, as measured along their length change axes 32, 33, causes the piston member 34 to move transversely of elongate axis 21 as indicated by arrow 41 in FIG. 2.

Differential changes in the lengths of the piezoelectric actuator elements 24, 26 may take the form of e.g. causing element 24 to extend by a greater amount than element 26 that may in this situation exhibit a lesser increase in length than element 24, or no change in length. Alternatively element 26 may be caused to extend by a greater amount than element 24 if desired. Yet a further possibility is for one of the piezoelectric actuator elements 24, 26 to undergo extension and the other to undergo contraction along the relevant length change axis 32, 33.

When as in the FIG. 2 embodiment the lengths and angles of the actuator elements 24, 26 are the same the length increase in one actuator must be matched by an equal length decrease in the other to achieve linear output. Systems are possible with non-matching actuator lengths and/or angles in which case the length changes must be in a suitable ratio to achieve linear output.

Figure 7:
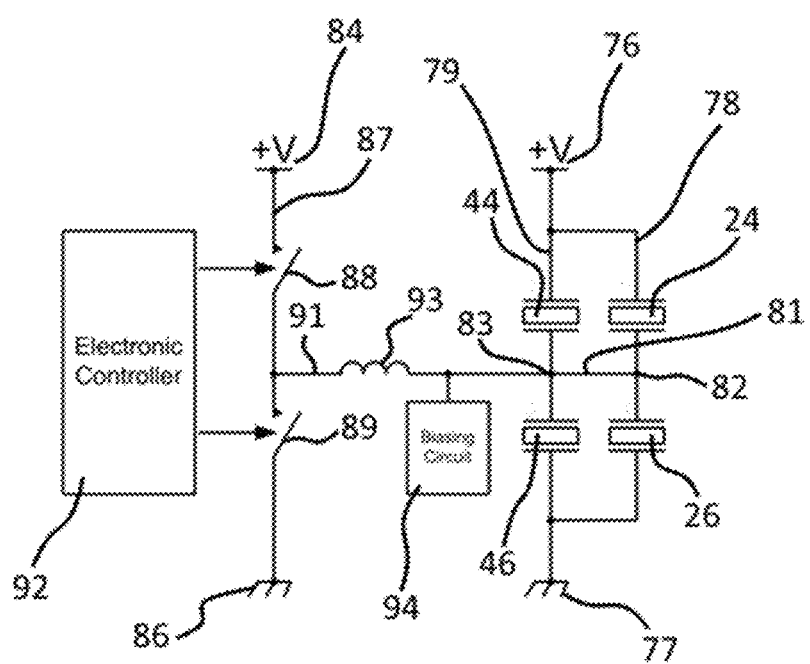
FIG. 7 shows a simple driver circuit that may be used to drive differential extension of piezoelectric actuator elements forming parts of the embodiments described.

In all such cases the changes in length of the piezoelectric actuator elements may be effected through the application of chosen voltages by a driver circuit. The person of skill in the art will be familiar with the kinds of voltage waveform needed to cause such differential changes in length of the elements 24, 26. The person of skill in the art also will be familiar with designs of the driver circuit that are suitable to cause the desired length changes. One non-limiting circuit example that is suitable for this purpose is shown in FIG. 7, described herein.

Transverse movement of the piston member 34 in one of the directions indicated by arrow 41 creates as described below a pressure pattern in fluid 14*a* surrounding the emitter section 11. The dipole waveform if desired may be generated as part of a wave train by causing repeated oscillation of the piston member 34 from side to side in the direction of arrow 41. The dipole pressure pattern generated by the described movement of the piston member 34 in practical use of the waveform generator 20 becomes transmitted through the rock as described above.

As is typical in the case of downhole waveform generators the hollow housing 19 while fluid-tight includes a respective transmission window adjacent each piston head 36, 37 or in some embodiments a single window that extends from the vicinity of one of the piston heads 36 to the vicinity of the other 37. A for example metal sleeve encircles the waveform generator in the vicinity of the window(s). As a result contact of the piston heads 36, 37 with the sleeve as the piston moves as indicated by arrow 41 generates a respective pressure waveform on each of two opposite sides of the emitter sub 11. The pressure waveforms define a dipole waveform that is useful in acoustic logging activity.

The described sleeve in many embodiments is rigid but in other embodiments may be flexible.

The arrangement of force-transferring elements as described above gives rise to significant movement of the piston compared to the extension and/or contraction of the piezoelectric actuator elements 24, 26. As a result the amplitude of the dipole pressure waveform is large, giving rise to an improved signal-to-noise characteristic of the waveform generator 20 compared to the prior art.

Since the trapezoidal force transfer network of the components 22, 24, 26 and 34 means that the motion of the piston member 34 is amplified compared with the amount of extension of the piezoelectric actuator elements 24, 26, the local surface velocity of the piston member achieves a higher value than has been possible in pressure-inducing elements in prior art waveform generators. This gives rise to the further result that a more energetic dipole waveform than has been available in the prior art is transmitted to the rock. As explained, this offers numerous advantages during logging operations.

The amplitude of the piston motion may be determined according to the requirements of the logging tool designer. Similarly the resonant frequency of the system may be selected in dependence on the stiffness of the piezoelectric actuators and/or the mass of the piston 34 and/or the magnitude of any pre-compression loading as described below and/or the angles of the actuator elements, the stiffness of nominally rigid parts and/or masses of moving components of the generator 20.

In addition to the foregoing the amplification ratio of the waveform may be adjusted as one of several design parameters of the generator 20, as explained herein.

Figure 3:
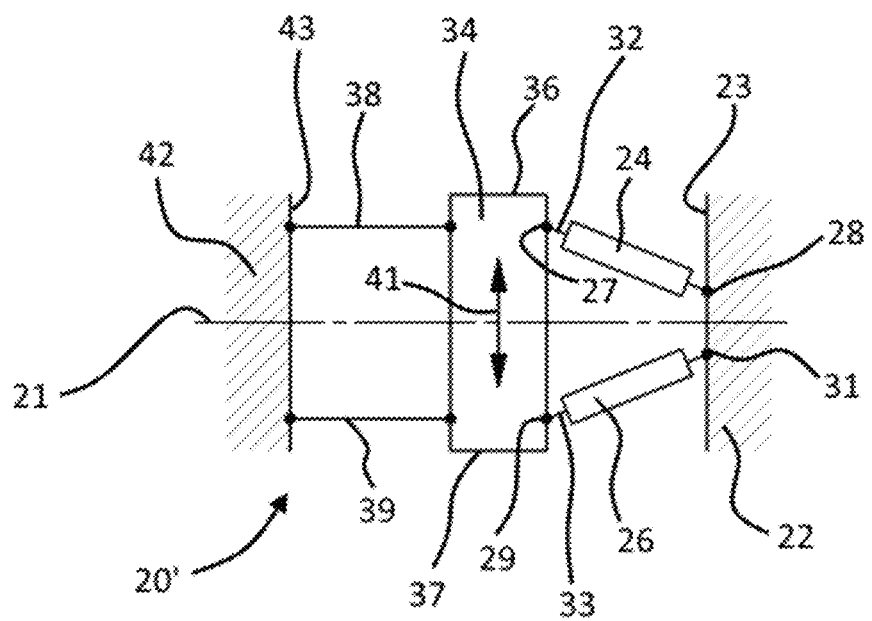
FIG. 3 shows a second embodiment of an acoustic dipole waveform generator according to the present disclosure.

A variant on the FIG. 2 waveform generator is shown in schematic view in FIG. 3.

In FIG. 3 counterpart components to the components of FIG. 2 are identified by the same reference numerals and are not further described in detail herein.

The acoustic dipole waveform generator 20' of FIG. 3 differs from that of FIG. 2 chiefly in the arrangement of the piezoelectric actuator elements 24, 26 relative to the rigid arms 38, 39; and through the inclusion of a second force reaction member 42 defining a second force reaction surface 43.

Second force reaction member 42 is located inside the hollow interior of the housing 19 (that also is omitted from FIG. 3 for ease of illustration) on the opposite side of piston member 34 to that of first force reaction member 22 and typically would take the same form as the first force reaction member 22. In consequence second force reaction surface 43 lies opposite first force reaction surface 23 on the opposite side of piston member 34.

Instead of interconnecting the piston member 34 and the first force reaction surface 23, the mutually spaced apart rigid arms 38, 39 interconnect the piston member 34 and the second force reaction surface 43. As in the case of FIG. 2 the rigid arms 38, 39 include hinge connections at each end by means of which they are secured respectively to the piston member and the second force reaction surface 43.

In addition the length change axes 32, 33 of the piezoelectric actuator elements 24, 26 diverge from one another when considered in the direction from the first force reaction surface 23 towards the piston member 34.

Operation of the acoustic waveform generator 20' of FIG. 3 is similar to that of waveform generator 20 of FIG. 2. Thus differential changes in the lengths of the piezoelectric actuator elements 24, 26 along the length change axes 32, 33 cause amplified movement of the piston member 34 perpendicular to elongate axis 21 by reason of the motion-constraining effect of the rigid arms 38, 39. This generates a dipole pressure pattern in the fluid surrounding the housing in the manner described above. The presence of a similar rigid sleeve to that described above means that any such pressure pattern is transmitted externally of the dipole waveform generator 20' into borehole fluid surrounding the emitter sub 11 containing the generator 20' and thence to the adjacent rock. As in the case of the FIG. 2 embodiment the pressure pattern is more energetic than is available using prior art waveform generators.

Figure 4:
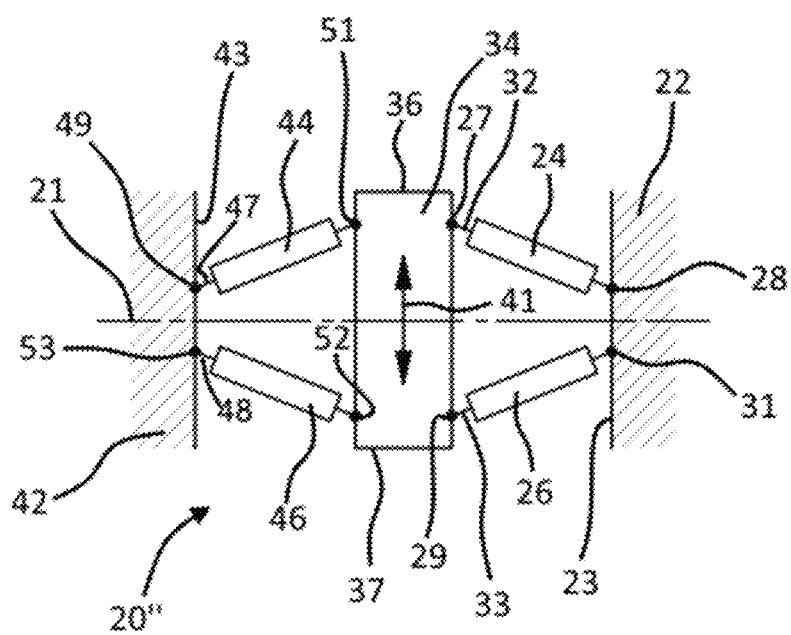
FIG. 4 shows a third embodiment of an acoustic dipole waveform generator according to the present disclosure.

A further variant of acoustic dipole waveform generator 20" is shown in schematic form in FIG. 4.

The waveform generator 20" of FIG. 4 is similar to that of FIG. 3. Counterpart features to those of FIGS. 2 and 3 are identified using the same reference numerals, and are not described in detail herein.

The primary difference between the FIG. 3 and FIG. 4 embodiments is that in FIG. 4 the rigid arms 38, 39 are replaced by a second pair of piezoelectric actuator elements 44, 46. These interconnect the opposite side of piston 34 to that on which the first pair of piezoelectric actuator elements 24, 26 are hingingly secured and the second force reaction surface 43, by way of respective hinge joints 49, 51, 52, 53 as illustrated.

In the FIG. 4 arrangement the length change axes 32, 33 of the first pair of piezoelectric actuator elements diverge towards the piston member 34; and the same is true of the length change axes 47, 48 of the second pair of piezoelectric actuator elements 44, 46.

Transverse motion of the piston member 34 such as to produce a dipole pressure pattern in a similar manner to that described above is caused by differential driving of the pairs of piezoelectric actuator elements 24, 44, 26, 46.

A slightly more complex driver action is required than in the case of the embodiments of FIGS. 2 and 3. Thus in the FIG. 4 arrangement the pair 24, 44 of piezoelectric actuator elements are driven together by the driver circuit and the other pair 26, 46 driven together simultaneously and oppositely to the pair 24, 44.

Thus if for example the angles of elements 24 and 44 are equal and opposite to the counterpart angles of elements 26 and 46 and the lengths of the elements are all the same, then extension of elements 24 and 44 must be equal to contraction of elements 26 and 46.

Operation of the arrangement of FIG. 4 as outlined achieves similar benefits in terms of dipole pressure pattern amplification as inure to the other embodiments. The FIG. 4 embodiment addresses a feature of the embodiments of FIGS. 2 and 3 in that the rigid links 38, 39 through mass loading, i.e. reducing the force to mass ratio, tend to reduce the velocity of the piston 34 and therefore limit the frequency of the dipole waveform that can be achieved.

Figure 5A:
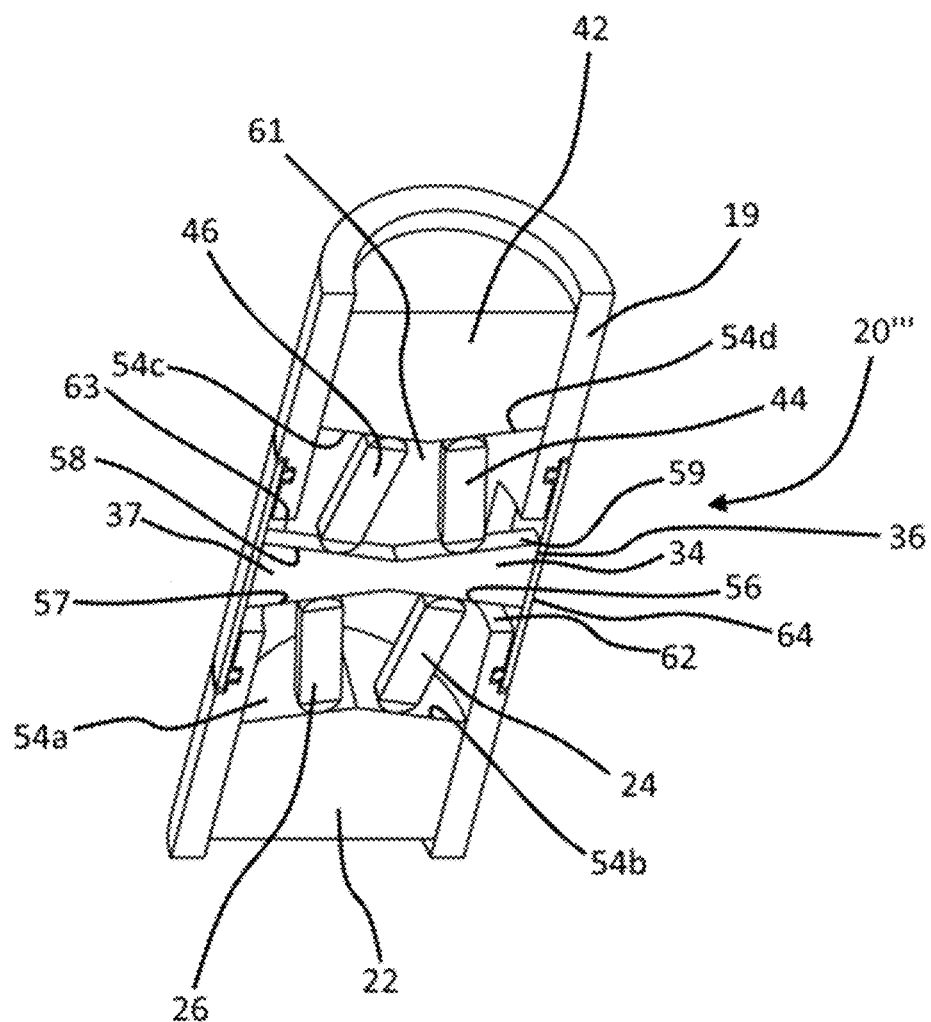
FIG. 5A shows in sectioned, perspective view part of a fourth embodiment of an acoustic dipole waveform generator according to the present disclosure also including a hollow housing, pressure emitter windows, a fluid-tight sleeve and an oil-filled chamber.

FIG. 5A illustrates in perspective, sectioned view a variant 20''' on the FIG. 4 embodiment.

In FIG. 5A the counterpart components to those of FIG. 4 are identified using the same reference numerals as in FIG. 4.

The first major difference between the FIG. 5A embodiment and that of FIG. 4 is that the first force reaction member 22 presents a pair of contiguous, mutually skewed, planar, first, force reaction surfaces 54a, 54b each facing towards and angled relative to the side of the piston member 34.

Similarly the second force reaction member 42 defines a pair of contiguous, mutually skewed, planar, second, force reaction surfaces 54c, 54d that are angled similarly to the first force reaction surfaces 51, 52 and lie on the opposite side of the piston member 34.

The sides of piston member 34 facing respectively the first force reaction surfaces 54a, 54b and the second force reaction surfaces 54c, 54d themselves each define a pair of mutually angled reaction surfaces 56, 57, 58, 59.

The first pair of piezoelectric actuator elements 24, 26 have length change axes that diverge when considered in the direction from the first force reaction member 22 to the piston member 34, as do the length change axes of the second pair of piezoelectric actuator elements 44, 46. The orientations of the various surfaces 54a, 54b, 54c, 54d, 56, 57, 58 and 59 assist in permitting the ready hinging attachment of the piezoelectric actuator elements.

Operation of the waveform generator 20''' of the FIG. 5A embodiment is similar to that of the FIG. 4 embodiment.

FIG. 5A additionally shows the cylindrical housing 19 that typically would encircle the components of the acoustic waveform generators 20, 20', 20" and 20''' in practical acoustic logging tool subs.

Housing 19 together with the force reaction members 22, 42 defines a hollow interior 61 that is fluid tight and as mentioned is typically filled with an oil.

Respective pressure pulse transmission windows 62, 63 are formed in the housing 19 opposite the ends of piston member 34 that define the piston heads 36, 37. The transmission windows 62, 63 are closed by a stiff, moveable sleeve 64. This prevents the egress of oil from the hollow interior 61 and also prevents the ingress of borehole fluid thereinto, while permitting the external transmission of pressure waveforms created by the interior components as described. In use the sleeve 64 moves as a rigid body in permitting the external transmission of pressure to the borehole fluid.

Figure 5B:
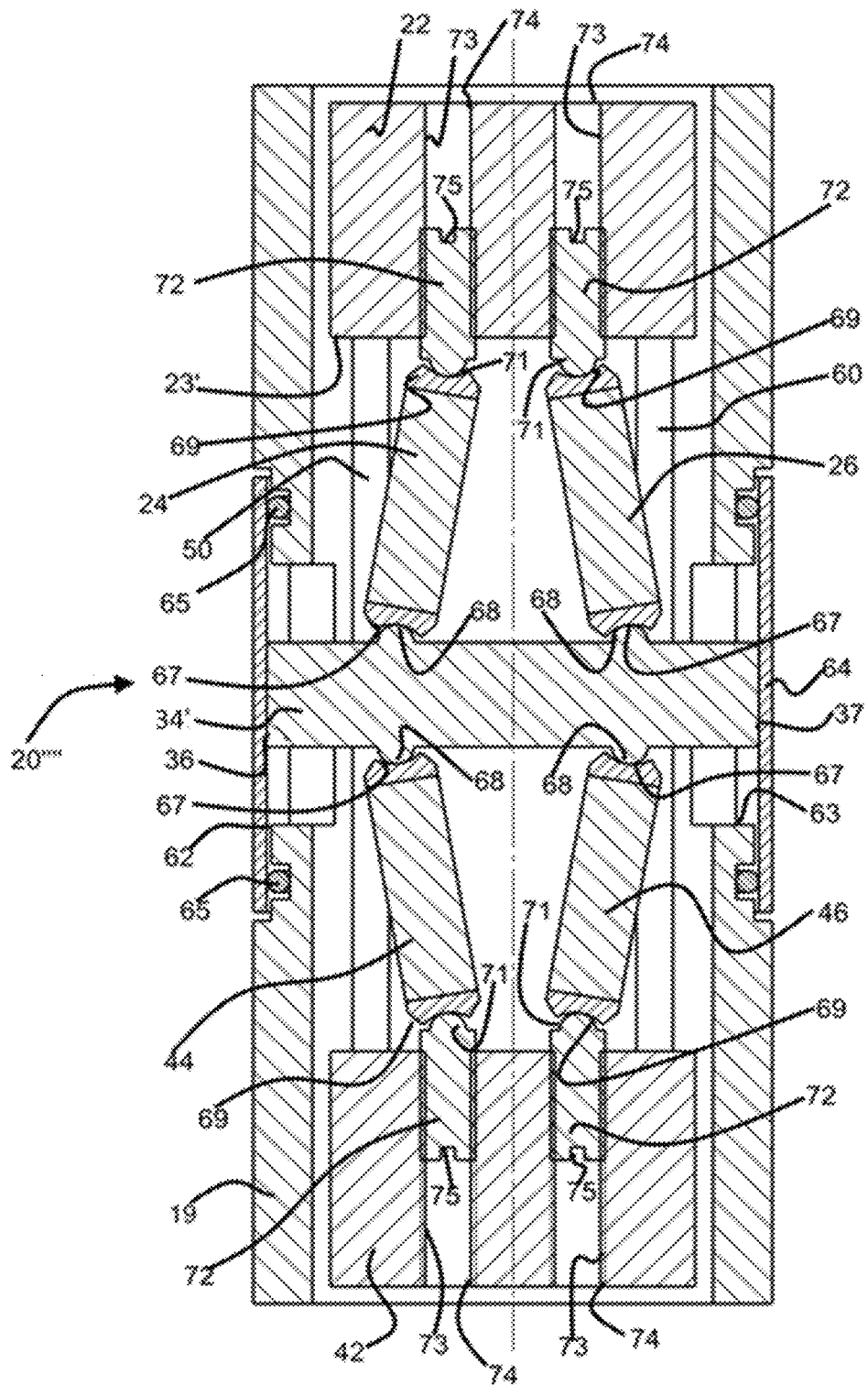
FIG. 5B shows a variant on the FIG. 5A embodiment.

FIG. 5B illustrates a variant on the FIG. 5A arrangement. The embodiment illustrated in FIG. 5B is presently the most preferred version.

Several aspects of the waveform generator 20'''' FIG. 5B arrangement are similar to the counterpart features visible in FIG. 5A. Thus in FIG. 5B a rigid, hollow, oil-filled cylindrical housing 19 includes retained at either end, spanning its hollow interior, respective first and second force reaction members 22, 42.

The first and second force reaction members 22, 42 are circular cylindrical discs made e.g. by machining metal blanks. As described below they are secured in a different manner to the counterpart components in e.g. FIGS. 2 to 5A in a mutually spaced relationship as illustrated, such that planar faces 23', 43' oppose one another inside the hollow interior of housing 19.

In particular, as an alternative to the fixed securing of the reaction members 22, 42 these adopt a "floating" mounting in FIG. 5B. In such an embodiment the reaction members 22, 42 may be interconnected by tension members (such as but not limited to mutually parallel tension rods 50, 60) that resist or curtail any tendency of preloading of the actuator elements 24, 44, 26, 44 to push the reaction members 22, 42 apart from one another.

As illustrated, circumferential gaps exist between the reaction masses 22, 42 and the inner wall of the housing 19. The gaps are shown slightly exaggerated in size, compared with a physical embodiment, for ease of illustration.

The tension rods 50, 60 are in FIG. 5 shown extending on the same side of piston 34' but this need not necessarily be the case. Also it is at least theoretically possible for the piston 34' described below to be perforated in order to accommodate one or both the tension rods 50, 60. Any such arrangement of course would need to be such as to avoid impeding movement of the piston 34'.

The faces 23', 43' of FIG. 5B are configured differently than the surfaces 23, 43 of e.g. FIGS. 3 and 4, as further described below.

As in certain other embodiments described herein moveable piston 34' extends transversely relative to the elongate axis of the waveform generator 20'''' mid-way between the force reaction members 22, 42. Piston 34' also differs from the counterpart components in the other embodiments, as explained herein.

Rigid sleeve 64 encircles the middle region of housing 19 so as to cover transmission windows 62, 63. O-ring seals 65 prevent the flow of fluid between the inside and the outside of the housing 19' via the windows 62, 63. The heads 36, 37 defining the ends of piston 34' contact the inner surface of sleeve 64 on opposite sides of the elongate axis of the waveform generator 20''''. Movement of the piston transversely relative to the aforesaid elongate axis causes movement of the sleeve 64 in a manner giving rise to a dipole pressure pattern as previously described.

Four piezoelectric actuator elements 24, 26, 44, 46 are arranged within the hollow interior of housing 19 approximately in the same way as the counterpart actuators of FIG. 5A. However the manner of hinging connection of the piston 34' to the actuators 24, 26, 44, 46 and of the actuator element 24, 26, 44, 46 to the force reaction members 22, 42 differs from the FIG. 5A arrangement.

At its end contacting piston 34' each actuator element 24, 26, 44, 46 is formed to include a respective part-spherical or at least curved recess 67. Each recess 67 engages and receives a respective part-spherical protuberance 68 formed on the surface of piston member 34' adjacent the associated actuator element 24, 26, 44, 46. As a result each actuator element 24, 26, 44, 46 is hingingly connected to the piston 34' by way of a joint 67, 68 that resembles an anatomical ball and socket joint.

At its end opposite the piston member 34' each actuator element 24, 44, 26, 46 is formed to include a similar part-spherical recess 69 to the recesses 67. This recess 69 in each case receives and engages a similar part-spherical protuberance 71 to the protuberances 68, thereby defining four similar joints 69, 71 to those connecting the actuator elements 24, 26, 44, 46 to the piston 34'.

The protuberances 71 are each formed at the ends of respective force pre-compression members. These are in the form of elongate, headless, threaded set screws 72.

Each of the set screws 72 is threadedly received in a respective, threaded bore 73 formed in one or other of the force reaction members 22, 42. The bores 73 are so positioned that the set screws 72 when received in them may be arranged to protrude from the associated force reaction member 22, 42 adjacent the actuator elements 24, 26, 44, 46 so as to form the described hinging connections.

The bores 73 respectively extend through the associated force reaction member 22, 42 and terminate in openings 74 on the opposite sides of the force reaction members 22, 42 to the actuator elements 24, 26, 44, 46. Each of the set screws 72 is formed with a drive feature at its end opposite the protuberance 71. In the illustrated embodiment the drive feature is shown as a slot 75 that is suitable for receiving the blade of a screwdriver. In other embodiments of the present disclosure the drive feature could take another form such as but not limited to a hexagon key recess.

A tool such as a screwdriver or hexagon key may be inserted via each said opening 74 in turn for engagement with the drive feature of a said set screw 72. Rotation of the set screw 72 using the tool adjusts the extent to which its protuberance 71 protrudes from the associated surface 23', 43' and thereby adjusts the amount of compressive preload applied to each of the actuator elements 24, 26, 44, 46. This effect in turn may usefully be used to tune the performance of the waveform generator in accordance with user requirements. In practice, the piston moves until the preload is equal in all the actuators. Only one adjuster therefore is needed to control the preload, but all are used to align the piston correctly.

FIG. 6 illustrates in simplified form the kind of dipole pressure pattern that can be generated in borehole fluid using the apparatus of the present disclosure. The magnitude of the pressure maxima visible in FIG. 6 will depend in part on the fluid impedance of the borehole fluid.

FIG. 6 shows a plan view of the radial variation of the pressure signal magnitude against angle. A pressure increase in one direction) (0°) is balanced by an equal but negative decrease in the opposite direction (180°). Pressure nulls occur at 90° and 270°. In other words, looking end-on to the elongate axis 21 of FIG. 4, FIG. 6 shows the radial variation of the pressure signal magnitude against angle, expected for the piston head 36.

FIG. 7 illustrates in schematic form a simple driver circuit that may be used to cause differential expansion of the piezoelectric actuator elements as described herein.

In FIG. 7 the actuator elements 24, 44, 26, 46 of e.g. FIG. 5A or FIG. 5B are shown connected to a potential supply arrangement in which (a) the actuator elements 24, 26 are connected in series between a voltage source 76 and ground 77 in a first circuit branch 78; and (b) the actuator elements 44, 46 are similarly series connected between the voltage source 76 and ground 77 in a second circuit branch 79. The circuit branches 78, 79 are electrically interconnected by a circuit link 81 bridging the circuit branches 78, 79 at their respective mid-points 82, 83.

The circuit mid-points 82, 83 are also connected by way of control line 91 to a voltage control arrangement. This includes a voltage source 84 and ground 86, that optionally may be the same as the voltage source and ground 76, 77 and that are interconnected by a switching line 87.

Switching line 87 includes controllable on-off switches 88, 89 lying respectively on opposite sides of control line 91. An electronic controller 92, such as but not limited to a programmable ASIC, Op-Amp controller, SCR, MOSFET or other logic device controls opening and closing of the switches 88, 89 in dependence on the required movement of the piston 34 or 34' at any instant. It will be apparent that through appropriate programming of the electronic controller 92 the switches 88, 89 may be opened and closed in a sequence giving rise to a desired sequence of extensions and contractions of the actuator elements 24, 44, 26, 46. As previously described such operation of the actuator elements 24, 44, 26, 46 is such as to effect transverse movement of the piston 34 or 34' giving rise to generation of a pressure pattern as illustrated in FIG. 6.

It is commonplace but not mandatory in a circuit such as that shown in FIG. 7 to include various signal and/or voltage conditioning features. Examples are illustrated in the form of tuning inductor 93 and biasing circuit 94. These components however are not intended to be limiting, and a wide variety of additional or alternative signal conditioning arrangements may be included.

The tuning inductor 93 is matched to the natural resonance of the driver circuit, thereby limiting its dynamic response to the desired natural frequency. Other potential resonant modes are suppressed or not excited. The tuning inductor 93 is selected according to the capacitance of actuators (44, 24, 46, and 26) and to ensure a match between the electrical and mechanical resonance of the system. The biasing circuit 94 determines, based e.g. on programming or external control signals, the voltages applied to the actuators 24, 44, 26, and 46. Therefore the biasing circuit determines the amplitudes of the length changes of the actuators 24, 44, 26, 46.

FIGS. 8A to 8M illustrate in schematic form various further embodiments, of varying degrees of complexity. These arrangements are exemplary of the many ways in which the present disclosure can be embodied. They are not limiting of the scope of the present disclosure as claimed herein.

Figure 8A:
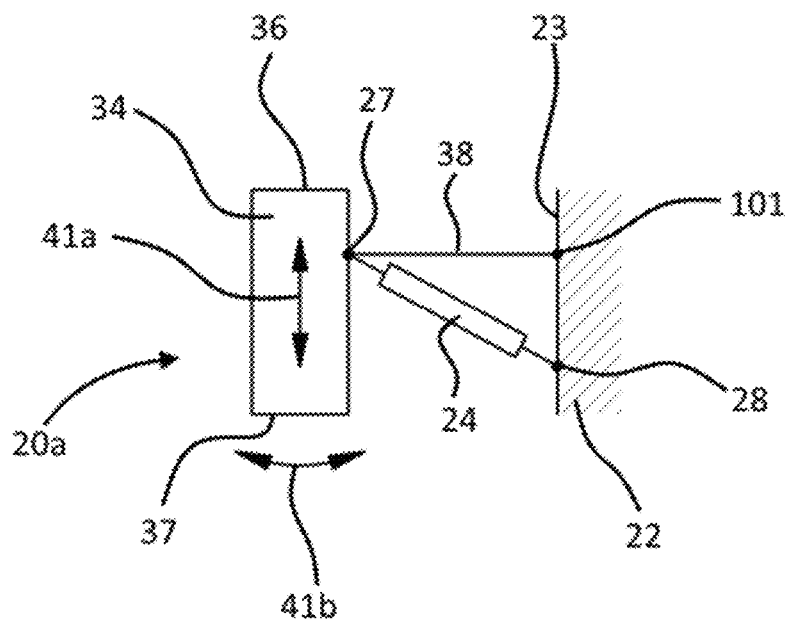
FIGS. 8A to 8M show in schematic form various alternative layouts of dipole waveform generators according to the present disclosure.

FIG. 8A shows a simple form of main components of the waveform generator 20a of the present disclosure. In FIG. 8 a single piezoelectric actuator element is hingingly connected at one end 28 to a reaction surface 23 of a floating mass member 22 that typically is of a similar construction to mass member 22 of FIG. 2.

At its opposite end 27 actuator element 24 is hingingly connected to a side of a piston member 34. A rigid arm 38, which may be similar to the rigid arms 38, 39 of FIG. 2 or may differ therefrom, hingingly interconnects the end 27 of actuator element 24 and a location 101 on the surface 23 that is spaced from hingingly connected end 28 of actuator member 28.

For completeness it is here stated that references herein to one or more rigid arms should not be construed as limited to recognizable arm-like members. On the contrary the functions of the rigid arms may be performed by a wide range of force-transmitting elements, including members of various shapes; masses; and components having additional functions to the force-transmitting ones described.

In use of the FIG. 8A waveform generator 20a expansion and contraction of the actuator element 24 under the control of a driver circuit, which may be a simplified version of the FIG. 7 circuit or may take other forms, causes movement of the piston member 34. This movement is constrained by the rigid arm 38. As illustrated in FIG. 8A by arrows 41a and 41b the constraint provided by the rigid arm 38 and the actuator element 24 means that the piston may move transversely relative to the elongate axis of the waveform generator. The piston also moves in an arcuate path as signified by arrow 41b, through hinging at the connection point 27.

Figure 8B:
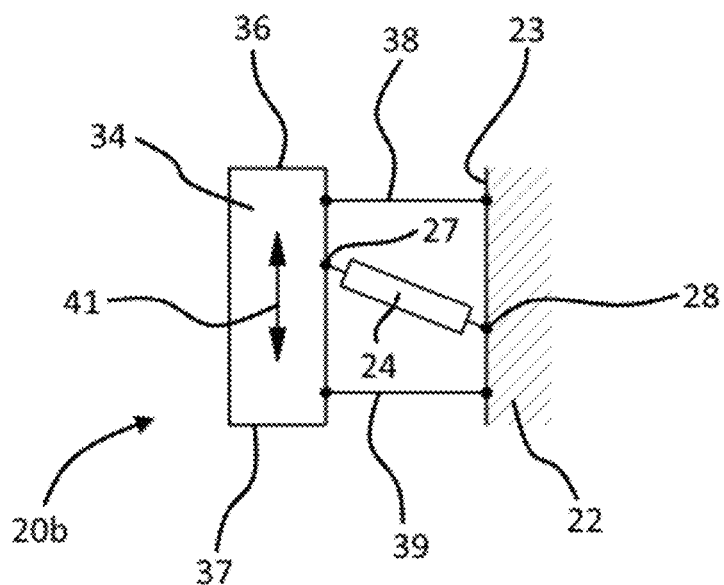

Such arcuate movement can be eliminated through adoption of one of the layouts in FIGS. 2, 3, 4, 5A or 5B; or by adopting the arrangement of FIG. 8B.

The FIG. 8B embodiment 20b is similar to that of FIG. 8A, except that firstly the points of hinging attachment of the end 27 of the actuator element 24 and that of the rigid arm 38 are spaced from one another along the length of the piston member 34; and secondly that a further rigid arm 39 extends between the reaction surface 23 and the piston 34 on the opposite side of actuator element 24 to rigid arm 38.

Further rigid arm 39 is similar or identical to rigid arm 38, and extends parallel thereto. Similarly to rigid arm 38, further rigid arm 39 is hingingly secured at each end respectively to the reaction surface 23 and the piston member 34.

The result of this arrangement is that movement of the piston member 34 is constrained to take place only in the direction signified by arrow 41. The FIG. 8B arrangement therefore may be thought of as a single-actuator variant of the FIG. 2 construction.

Figure 8C:
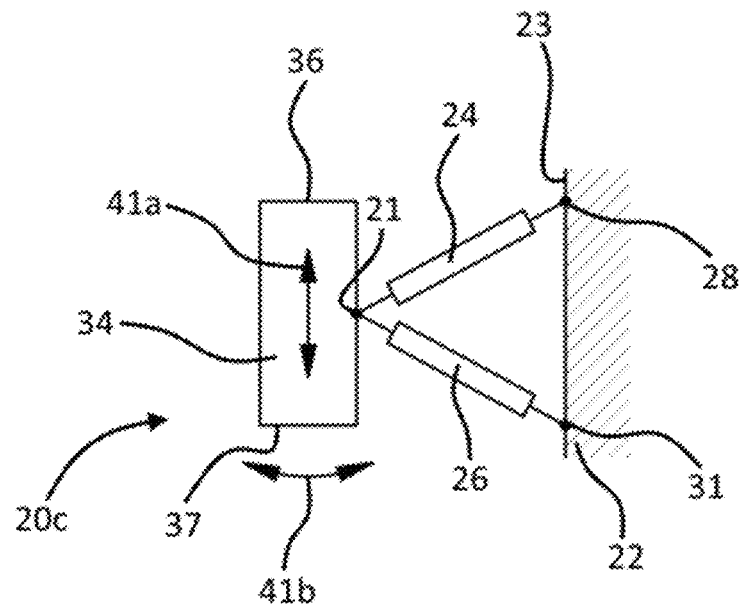

FIG. 8C illustrates a further embodiment, in which a pair of actuator elements 24, 26 extend between the force reaction surface 23 and the piston member 34 so as to define a triangular actuator arrangement.

In this construction the actuator elements 24, 26 are hingingly secured at spaced locations 28, 31 on the reaction surface 23 and are hingingly secured to the piston member 34 at a common location 27 that therefore defines the apex of the triangular actuator arrangement.

When the actuator elements 24, 26 are driven e.g. by a circuit similar to that of FIG. 7 so as to undergo differential length changes such that one of them extends while the other contracts the movement of the piston member 34 is constrained to be as indicated by the arrows 41a and 41b in FIG. 8C. The movement of the piston member 34 in other words is similar to that illustrated in FIG. 8A.

FIG. 8C omits any rigid arms or equivalent components, although in one mode of operation one of the actuator elements 24, 26 could be driven to be stationary while the other extends and contracts as required to induce movement of the piston member 34. At such a time the stationary actuator element 34 performs the function of the rigid arm 38 of FIG. 8A. Such movement of the piston member 34 would differ from the movement signified by the arrows 41a, 41b.

Figure 8D:
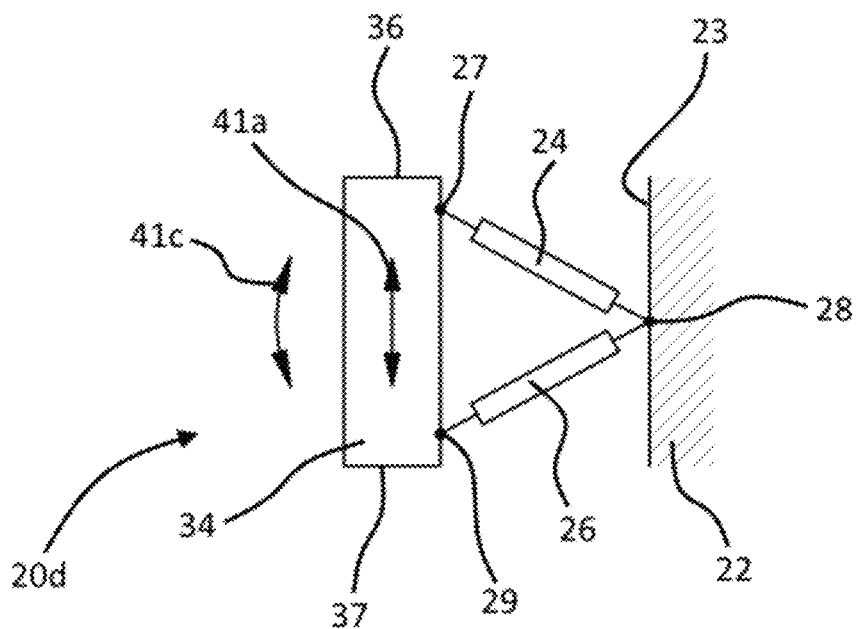

The embodiment 20d illustrated in FIG. 8D is similar to that of FIG. 8C, except that the positions of the apex and base of the triangular arrangement of the actuator elements 24, 26 are reversed. Thus ends of the actuator elements 24, 26 are hingingly secured to the reaction surface 23 at a common location 28; and the opposite ends of the actuator elements 24, 26 are secured to the piston member 34 at locations 27, 29 that are spaced along the length of the piston member 34.

When the actuator elements 24, 26 are driven to effect differential length changes in a similar manner to those described above the piston member 34 is constrained to move perpendicular to the elongate axis of the waveform generator 20d as signified by arrow 41a. The piston member 34 unless additionally constrained may also pivot as signified by arrow 41c.

Figure 8E:
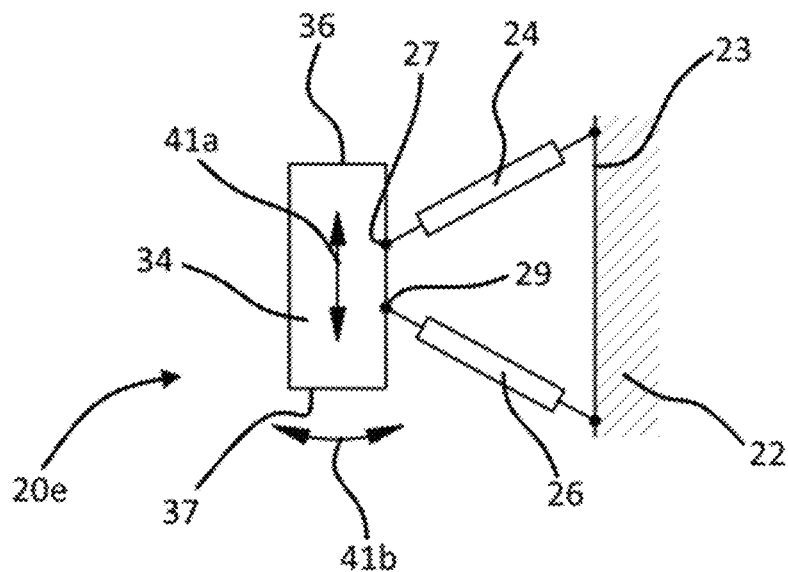

The FIG. 8E embodiment 20e is a variant on the FIG. 8C embodiment. In FIG. 8E the actuator elements 24, 26 hingingly attach to a side of the piston member 34 at spaced locations 27, 29 instead of a single hinging attachment point 27. This means that the force-transferring elements, namely the surface 23, the actuator elements 24, 26 and the piston 34, define a trapezoidal or truncated triangular shape.

This in turn means that operation of the actuator elements 24, 26 may be readily accommodated by movement of the piston 34. In particular, differential extension or contraction of the actuator elements 24, 26 under the influence of a driver circuit that may be similar to at least part of the circuit of FIG. 7 (that is, extension of both the actuator elements 24, 26 to differing degrees) may result in motion of the piston member 34 that is constrained as signified by the arrows 41a, 41b in FIG. 8E.

For the avoidance of doubt however it should be understood that in common with the other two-actuator embodiments described herein the FIG. 8E embodiment may operate through extension of one of the actuator elements 24, 26 and contraction of the other. Moreover, additional constraint of the motion of the piston member 34 may be desirable in the FIG. 8 embodiments.

Figure 8F:
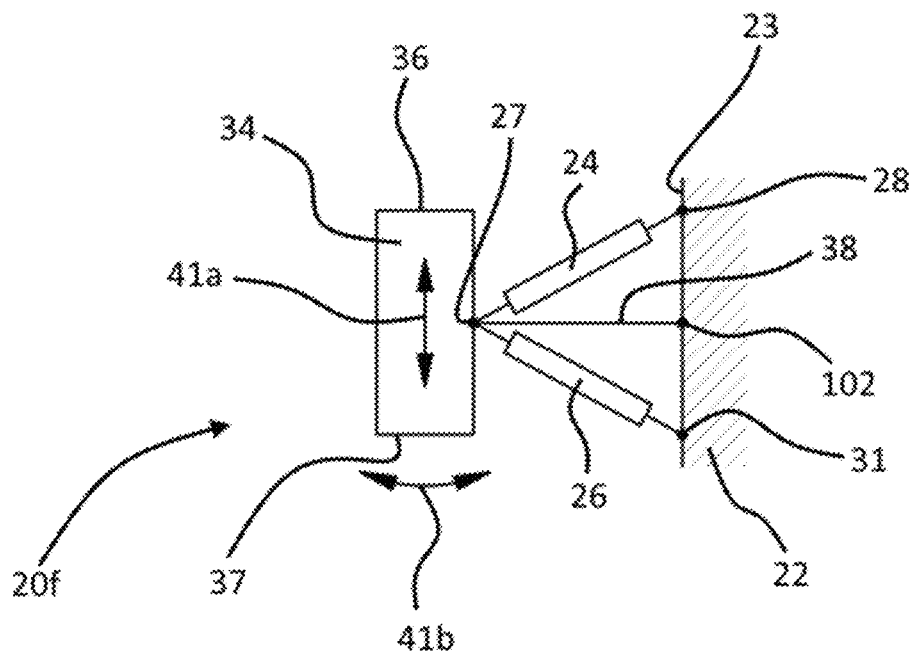

FIG. 8F shows an embodiment 20f that is a hybrid of the arrangements of FIGS. 8A and 8C. Thus in FIG. 8F a pair of actuator elements 24, 26 are hingingly attached to a side of the piston member 34 at a common location 27; and the opposite ends of the actuator elements 24, 26 are hingingly attached to the surface 23 at spaced locations 28, 31.

A rigid arm 38 or equivalent member is hingingly secured at one end to the piston member 34 and at the other end to the surface 23. Rigid arm 38 attaches to the piston member 34 at the common location 27 and to the surface 23 at a location 102 that is intermediate the points 28, 31.

The rigid arm 38 assists to stabilize the force-transferring arrangement in the FIG. 8F embodiment. The resulting, typical constrained movements of the piston member 34 are signified by the arrows 41a, 41b in FIG. 8F.

In the FIG. 8F embodiment the actuator elements 24, 26 may be preloaded in compression by preloading rigid arm 38 in tension. Various ways of tension pre-loading the rigid arm 38 will occur to the person of skill in the art and therefore are not described herein.

Figure 8G:
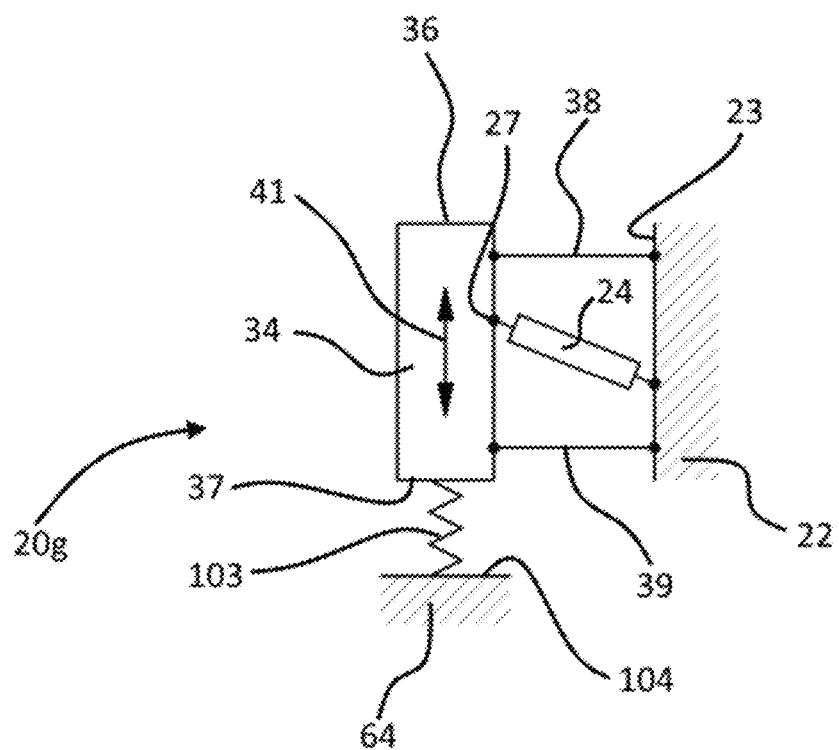

The arrangement 20g illustrated in FIG. 8G is a refinement of the FIG. 8B embodiment 20b. The waveform generator 20g differs from the waveform generator 20b in that a spring 103 or other resiliently deformable member acts between the piston head 37 and an auxiliary force reaction surface 104 that may be constituted by e.g. a wall of the sleeve 64 encircling the region of the waveform generator 20g that accommodates the piston member 34.

The spring 103 provides a preload on the actuator. The spring also could be augmented by a damper element acting in parallel to it, or potentially replaced by such a damper. The person of skill in the art would readily be able to embody such arrangements, which preferably could help with the selection of preferred pulse shaping and output bandwidth.

Numerous other embodiments described or illustrated herein could also be modified to include spring and/or damper members in a similar manner to FIG. 8G. At least the embodiments of FIGS. 2, 3, 4, 8B, 8H to 8K and 8M could readily be augmented in this way.

Figure 8H:
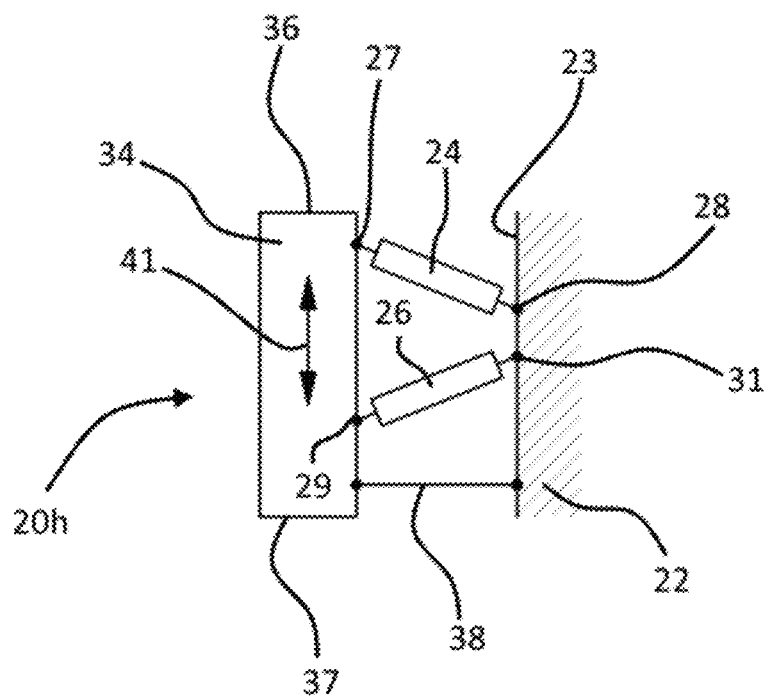

The waveform generator 20h of FIG. 8H includes two actuator elements 24, 26 that are hingingly secured at their ends 27, 28, 29, 31 to the piston member 34 and the surface 23 as illustrated. The attachment locations 28, 31 on the surface 23 are spaced from one another by a lesser spacing than that of the attachment locations 27, 29.

A rigid arm 38 or equivalent component extends between the piston member 34 and the surface 23 as illustrated in order to help stabilize the arrangement. The result of the arrangement is that operation of the actuator elements 24, 26 such that a length differential is created between them results in constrained movement of the piston member 34 as signified by arrow 41.

FIG. 8H illustrates an arrangement of two actuator elements 24, 26 that could be applied in other embodiments of the present disclosure. Thus spaced attachments of the actuator elements 24, 26 with the attachment points 28, 31 on the surface 23 closer together than the attachment points 27, 29 on the piston member 34 could be employed e.g. in the embodiments of FIG. 2 or 8E.

Figure 8I:
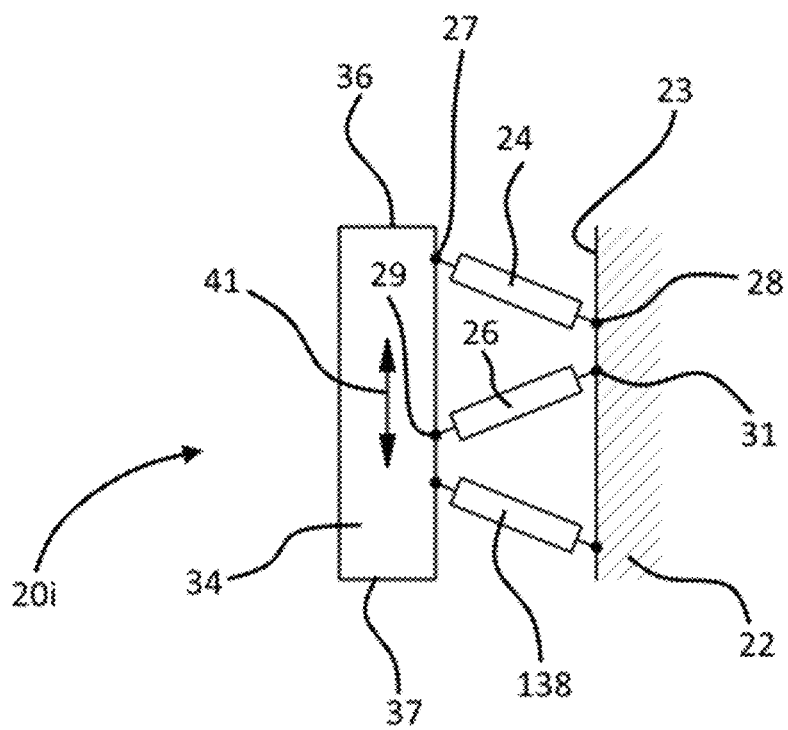

The waveform generator 20i of FIG. 8I is a variant of the FIG. 8H waveform generator 20h. In FIG. 8I the rigid arm 38 is replaced by a further actuator element 138 that is hingingly secured at one end to the piston member 34 and at the other end to the surface 23.

In FIG. 8I the actuator element 138 is shown extending parallel to the actuator element 24, but this need not be the case. Indeed on operation of the various actuator elements 24, 26, 138 in FIG. 8I their relative orientations may change, depending on the precise sequence of driver signals generated in a driver circuit (that may be a variant on the FIG. 7 circuit).

Typical constrained movement of the FIG. 8I waveform generator 20i is signified by arrow 41.

Figure 8J:
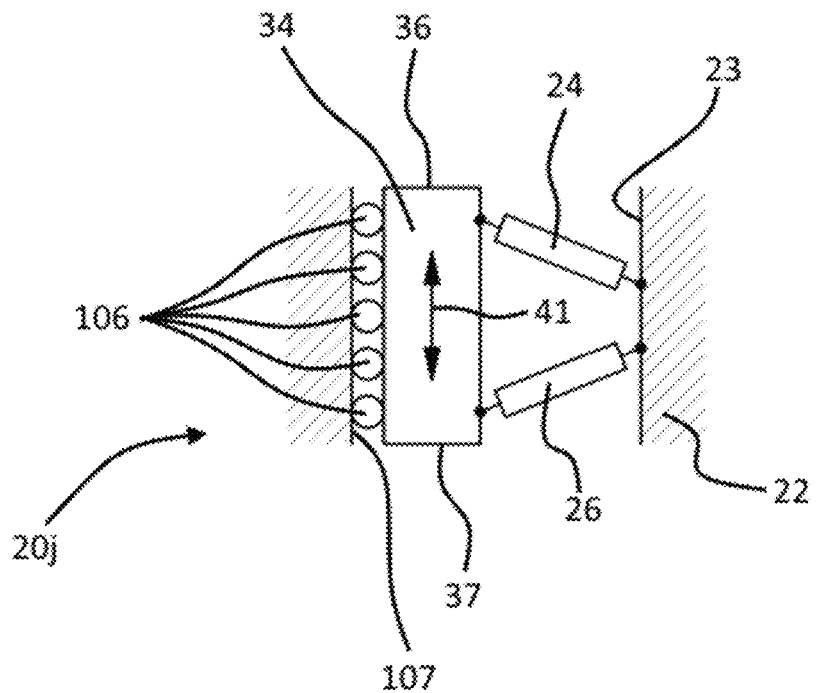

The waveform generator 20j of FIG. 8J illustrates an alternative approach to constraining the motion of the piston member 34 and that could be used in a number of different embodiments described herein, including but not limited to those of FIGS. 2, 8A, 8B, 8C, 8D, 8E, 8F, 8G, 8H and 8I.

In FIG. 8J a linear bearing arrangement, signified schematically by ball-bearings 106 and additional surface 107, between which and the piston member 34 the ball-bearings are interposed, ensures constrain of the piston member 34 to the directions signified by arrow 41.

In practice the linear bearing may be embodied in a number of ways as will be within the ability of the person of skill in the art to devise. Thus e.g. sliding or other bearing arrangements may be substituted, and the present disclosure is not limited to the illustrated roller bearing.

Figure 8K:
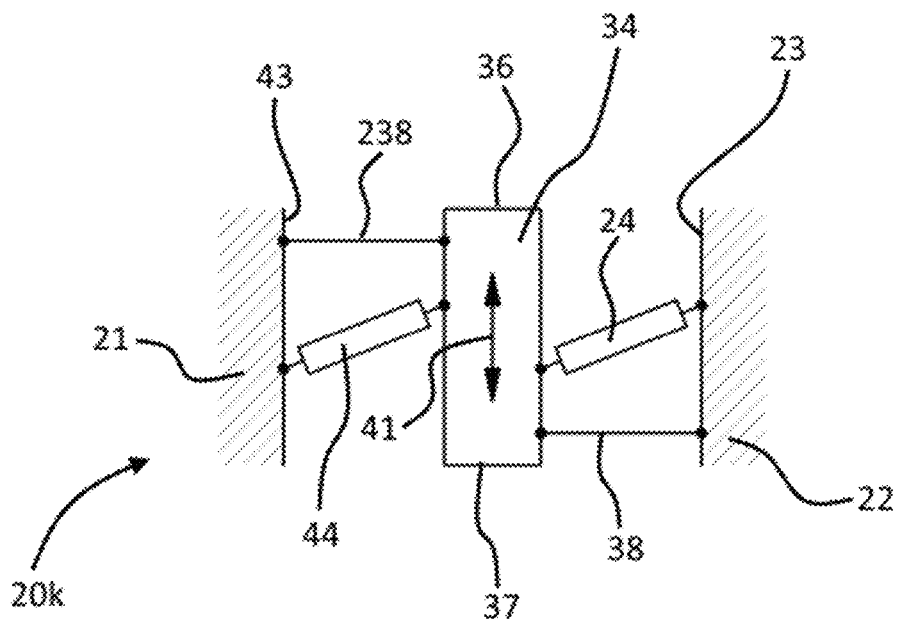

FIG. 8K shows a waveform generator 20k, that is a variant on the FIG. 4 waveform generator 20″ in that (a) there is only a single actuator element 24, 44 hingingly secured respectively on each side of the piston member 34 so as hingingly to be attached to a respective reaction surface 23, 43; (b) the second actuator members 26, 46 of FIG. 4 are replaced by respective rigid arms 38, 238; and (c) the actuator element/rigid arm pairs 24, 28 and 44, 238 diverge as they extend towards the associated reaction surface 23, 43 (whereas in FIG. 4 the pairs of actuator elements 24, 26 and 44, 46 are convergent in this direction).

In this embodiment the actuator elements 24, 44 can be preloaded against one another. Such an arrangement lends itself to packaging in a long, narrow space, as is frequently encountered inside a logging tool.

Arrow 41 illustrates in FIG. 8K the typical, constrained movement that may result from energizing of the actuator elements 24, 44 e.g. using a circuit that is a derivative of the FIG. 7 circuit.

Figure 8L:
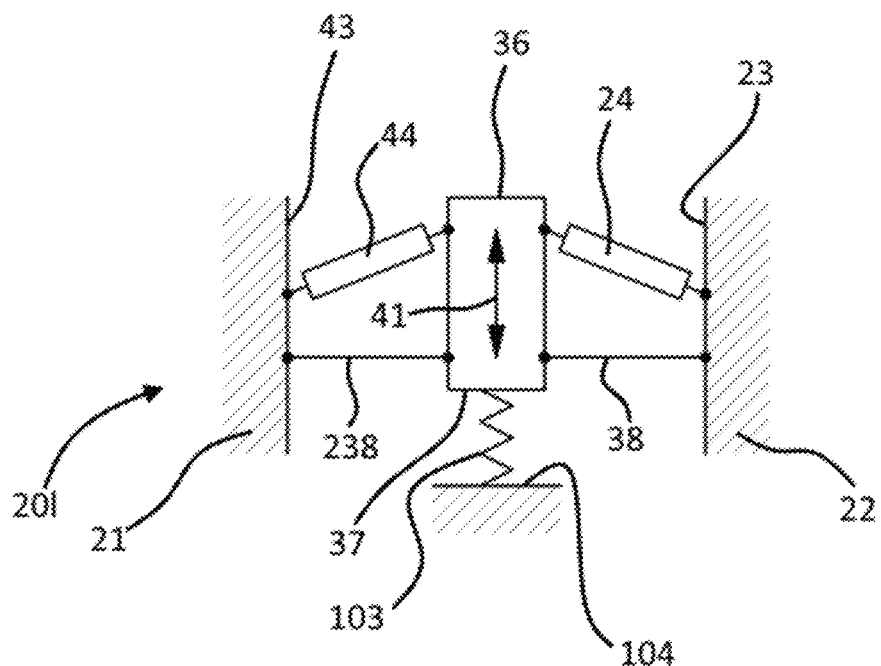

The waveform generator 20l of FIG. 8L is another example of an embodiment in which a respective actuator element 24, 44 is hingingly secured at its ends to (a) the piston member 34 and (b) a reaction surface 23, 43 such that the actuator elements 24, 44 extend on opposite, or at least non-aligned, sides of the piston member 34. This is another embodiment that beneficially is suited to installation inside a logging tool.

The majority of the components of the waveform generator 20l are the same as or similar to those of waveform generator 20k although they are arranged differently, in an arrangement that is a variant of FIG. 8G.

Thus an actuator element 24 and a hingingly secured rigid arm 38 converge in the direction approaching the surface 23; and an actuator element 44 and hingingly secured rigid arm 238 converge in the direction approaching the surface 43. Moreover the actuator elements 24, 44 are attached to the piston member 34 near the piston head 36, and the rigid arms 38, 238 are hingingly attached to the piston member 34 and the respective surfaces 23, 43 nearer the piston head 37.

A spring 103 or other resiliently deformable element and an auxiliary force reaction surface 104 are in waveform generator 20l arranged essentially as in the FIG. 8G embodiment. The spring 103 provides a preload which reduces the chances of the actuators 24, 44 cracking in use when these are embodied as piezoelectric devices.

A typical constrained motion of the piston member 34 of FIG. 8L is represented by arrow 41.

Figure 8M:
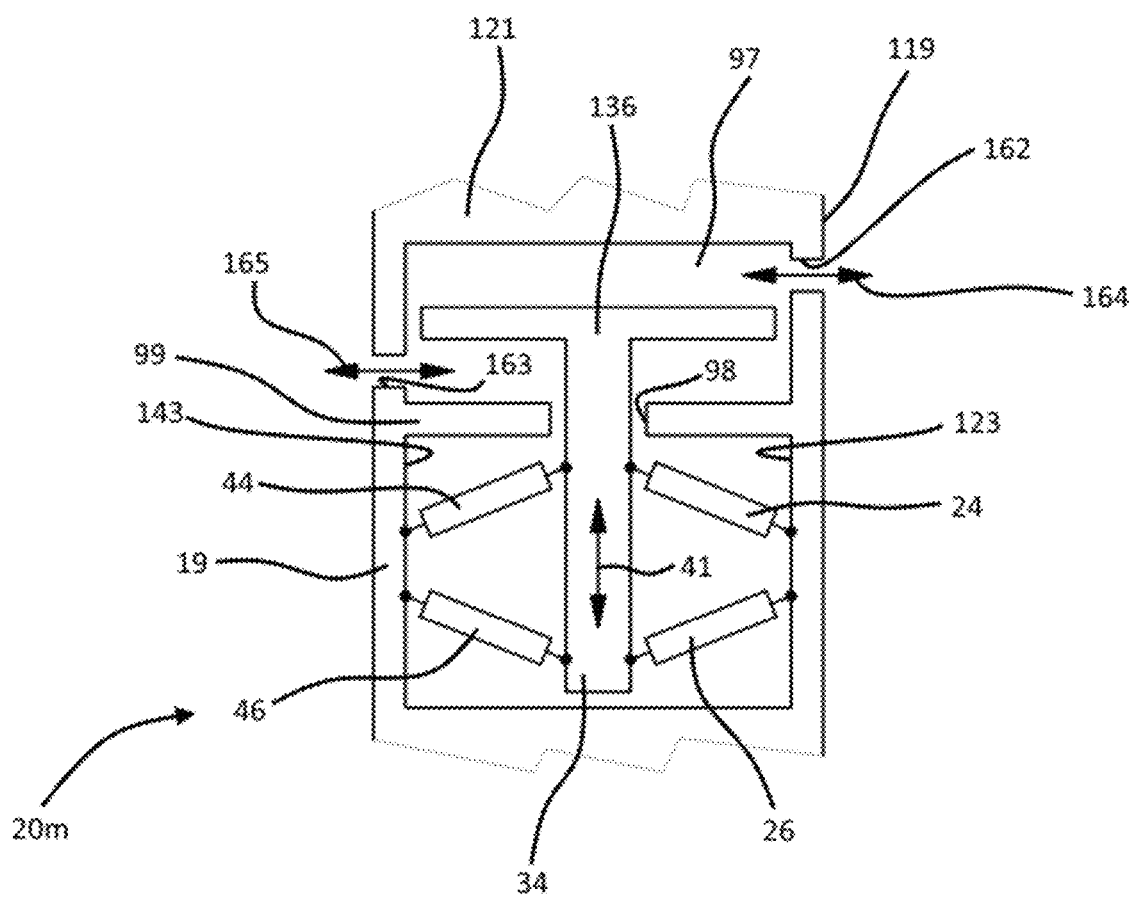

FIG. 8M illustrates a waveform generator 20m in which an arrangement similar to that of FIG. 4 is employed. However instead of the motion 41 of the piston member 34 being transverse to the longitudinal axis of the waveform generator, in FIG. 8M such motion is parallel to the elongate axis; and the waveform generator 20m includes a plenum chamber 97 that permits the emission of pressure pulses transversely to the elongate axis. Other examples in which the piston motion is not perpendicular to the tool axis are also possible.

In the waveform generator 20m actuator elements 24, 26, 44, 46 are each hingingly secured at one end to the piston member 34 in essentially the same way as in FIG. 4. At their opposite ends the actuator elements 24, 26, 44, 46 are secured to respective reaction surfaces 123, 143 by way of hinging connections as illustrated. However in FIG. 8M the reaction surfaces 123, 143 are not defined by floating mass members and instead are defined as walls of the housing 19 of the waveform generator (although in yet further embodiments of the present disclosure an arrangement similar to the FIG. 8M embodiment may include "floating" reaction masses as described above).

Piston member 34 extends via an aperture 98 formed in a bulkhead 99 defining one side of plenum chamber 97, the remaining sides of the plenum chamber being defined by an extension 119 of cylindrical housing 19 and a plug or cap 121 that is longitudinally spaced from bulkhead 99. Plenum chamber 97 therefore in the illustrated embodiment is a hollow cylinder.

Piston member 34 terminates inside plenum chamber 97 in a piston head 136 in the form of a rigid plunger the diameter of which is marginally less than the interior diameter of the plenum chamber 97. The piston head 136 therefore is a sliding fit inside the plenum chamber 97.

A pressure transmission window 162 extends through housing extension 119 on one side of the waveform generator 20m, between the piston head 136 and the plug/cap 121. A similar transmission window 163 extends through the housing extension 119 on the opposite side of the waveform generator 20m in the length of the housing extension 119 between the piston head 136 and the bulkhead 99.

Oscillation of the piston member 34 in the directions of arrow 41 as may be caused by activation of the actuator elements 24, 26, 44, 46 in the ways described herein causes reciprocation of the piston head 136 in the plenum chamber 97. This in turn causes fluid in the plenum chamber 97 to be pumped into and out of the plenum chamber 97 via the transmission windows 162, 163 as signified by arrows 164, 165. The pressure pulses thereby created in fluid surrounding the waveform generator 20m in the vicinities of the transmission windows 162, 163 are 180° out of phase with one another, thereby giving rise to the creation of a dipole pressure pattern having a very good signal-to-noise characteristic.

In order to achieve the foregoing effect the plenum chamber must be filled with a fluid of the same density and viscosity as the fluid surrounding the waveform generator 20m. This may be done by allowing borehole fluid, in which the waveform generator 20 is immersed, to enter the plenum chamber 97 via the windows 162, 163 on immersion of the waveform generator 20m in such fluid during deployment. Alternatively the chamber could be filled with oil and a movable or flexible sleeve or windows employed as in other embodiments described herein.

Additionally it is necessary for the aperture 164 to permit sealed sliding of the piston member 34 therein, in order to prevent fluid in the plenum chamber 97 from contaminating the components of the waveform generator 20m that lie on the opposite side of the bulkhead 99. Numerous sliding seal arrangements are known in the art.

In FIG. 8M the arrow 41 coincides with the elongate center axis of the waveform generator 20m and hence of the logging tool or toolstring of which it forms part.

Methods within the scope of the present disclosure include immersing an acoustic dipole waveform according to any embodiments hereof or as otherwise described herein in borehole fluid; and causing a differential change in length, along a respective length change axis 32, 33, 47, 48, of the members of at least one, and preferably at least a first pair, of piezoelectric actuator elements 24, 26, 44, 46 thereby causing movement of the piston member 34 in a direction perpendicular, parallel to or at an angle to the elongate axis 21 of the acoustic waveform generator and generating a dipole waveform in the fluid.

Methods within the scope of the present disclosure also include inserting an acoustic dipole waveform generator according to any embodiments hereof or as otherwise described herein into a fluid-filled cavity in the subterranean formation; operating the dipole acoustic waveform generator to generate a dipole pressure wave in the fluid filling the cavity such that the pressure wave permeates the formation; and, at a location remote from the dipole acoustic waveform generator, operating one or more sensors of pressure energy to generate one or more log signals characteristic of the pressure wave after it has permeated the formation. Such methods also optionally include processing the log signals into a geological log in numerical, tabular, database, graphical or image log form. The signals preferably are electrical signals generated by hydrophones or other pressure sensors but may adopt other forms as would occur to the person of skill in the art. The pressure wave at each of the sensors is usually digitized and stored or transmitted to the surface over a suitably long time period to capture all wave motions of interest.

Log data generated using the apparatuses of the present disclosure and/or in accordance with methods described herein is of considerable utility.

The listing or discussion of an apparently prior-published document in this specification should not necessarily be taken as an acknowledgement that the document is part of the state of the art or is common general knowledge.

Preferences and options for a given aspect, feature or parameter of the present disclosure should, unless the context indicates otherwise, be regarded as having been disclosed in combination with any and all preferences and options for all other aspects, features and parameters of the present disclosure.

What is claimed is:

1. An acoustic dipole waveform generator, comprising:
a hollow housing defining an elongate axis of the acoustic dipole waveform generator and having secured therein at least a first force reaction member defining at least a first force reaction surface and having hingingly secured thereto at least a length-changeable actuator element extending from the first force reaction member towards at least one moveable piston member that is hingingly secured to at least the actuator element inside the hollow housing,
the at least one piston member being constrained by one or more constraint members to move in a movement direction extending perpendicular to the elongate axis of the acoustic waveform generator,
the at least one piston member defining, respectively at mutually spaced locations in the housing, a pair of piston heads that, on movement of the at least one piston member, each generate a respective pressure wave, and the hollow housing permitting transmission of each of said pressure wave externally of the acoustic waveform generator, thereby permitting generation of a dipole pressure waveform externally of the hollow housing on changing of the lengths of the at least one actuator elements.

2. The acoustic dipole waveform generator of claim 1, wherein the length-changeable actuator element defines a length change axis; wherein an angle a subtended between the length change axis and the movement direction is in a range of 0<a<90 degrees; and wherein in use the acoustic dipole waveform generator generates a waveform that is amplified compared with movement of the length-changeable actuator element by an amplification ratio that is, or is proportional to, 1/cos(a).

3. The acoustic dipole waveform generator of claim 1, comprising a first pair of the actuator elements defining mutually non-aligned length change axes and extending from the first force reaction member towards the at least one piston member, the at least one piston member being hingingly secured to the first pair of the actuator elements.

4. The acoustic dipole waveform generator of claim 1, wherein the one or more constraint members comprise a pair of mutually spaced apart rigid arms that are each hingingly secured respectively to the at least one piston member and the first force reaction member, whereby to limit movement of the at least one piston member to a predetermined direction perpendicular to the elongate axis of the acoustic waveform generator.

5. The acoustic dipole waveform generator of claim 4, wherein when considered with reference to a direction extending perpendicular to the elongate axis of the acoustic waveform generator, the mutually spaced apart rigid arms lie outwardly of the actuator element.

6. The acoustic dipole waveform generator of claim 3, comprising a second force reaction member defining at least a second force reaction surface that is spaced from the first force reaction surface inside the hollow housing and lies on the opposite side of the at least piston member to the first force reaction surface.

7. The acoustic dipole waveform generator of claim 3, comprising a second force reaction member defining at least a second force reaction surface that is spaced from the first force reaction surface inside the hollow housing and lies on the opposite side of the at least one piston member to the first force reaction surface, wherein the one or more constraint members comprises a pair of mutually spaced apart rigid arms that are each hingingly secured respectively to the at least one piston member and the second force reaction member, whereby to limit movement of the at least one piston member to a direction perpendicular to the elongate axis of the acoustic waveform generator.

8. The acoustic dipole waveform generator of claim 3, comprising a second force reaction member defining at least a second force reaction surface that is spaced from the first force reaction surface inside the hollow housing and lies on the opposite side of the at least one piston member to the first force reaction surface, wherein the one or more constraint members comprise a second pair of actuator elements defining mutually non-aligned length change axes and each hingingly secured respectively to the at least one piston member and the second force reaction member, whereby the first and second pairs of the actuator elements limit movement of the at least one piston member to a direction perpendicular to the elongate axis of the acoustic waveform generator and permit generation of a dipole pressure wave externally of the hollow housing on changing of the lengths of the first and second pairs of the actuator elements along the length change axes.

9. The acoustic dipole waveform generator of claim 3, comprising a second force reaction member defining at least a second force reaction surface that is spaced from the first force reaction surface inside the hollow housing and lies on the opposite side of the piston member to the first force reaction surface; wherein the one or more constraint members comprise a second pair of actuator elements defining mutually non-aligned length change axes and each hingingly secured respectively to the at least one piston member and the second force reaction member; whereby the first and second pairs of the actuator elements limit movement of the at least one piston member to a direction perpendicular to the elongate axis of the acoustic waveform generator and permit generation of a dipole pressure wave externally of the hollow housing on changing of the lengths of the first and second pairs of the actuator elements along the length change axes; and wherein the second pair of the actuator elements are mutually divergent when considered in a direction from the second force reaction member to the at least one piston member.

10. The acoustic dipole waveform generator of claim 3, comprising a second force reaction member defining at least a second force reaction surface that is spaced from the first force reaction surface inside the hollow housing and lies on the opposite side of the piston member to the first force reaction surface; wherein the one or more constraint members comprise a second pair of actuator elements defining mutually non-aligned length change axes and each hingingly secured respectively to the at least one piston member and the second force reaction member; whereby the first and second pairs of the actuator elements limit movement of the at least one piston member to a direction perpendicular to the elongate axis of the acoustic waveform generator and permit generation of a dipole pressure wave externally of the hollow housing on changing of the lengths of the first and second pairs of the actuator elements along the length change axes; and wherein the second pair of the actuator elements are mutually convergent when considered in a direction from the second force reaction member to the at least one piston member.

11. The acoustic dipole waveform generator of claim 3, wherein the first pair of the actuator elements are mutually divergent when considered in a direction from the first force reaction member to the at least one piston member.

12. The acoustic dipole waveform generator of claim 3, wherein the first pair of the actuator elements are mutually convergent when considered in a direction from the second force reaction member to the at least one piston member.

13. The acoustic dipole waveform generator of claim 3, wherein the first force reaction member comprises a pair of first force reaction surfaces; and wherein each of the first pair of the actuator elements is hingingly secured to a respective said first force reaction surface.

14. The acoustic dipole waveform generator of claim 3, comprising a second force reaction member defining at least a second force reaction surface that is spaced from the first force reaction surface inside the hollow housing and lies on the opposite side of the at least one piston member to the first force reaction surface; wherein the second force reaction member comprises a pair of second force reaction surfaces;

and wherein each of the second pair of the actuator elements is hingingly secured to a respective said second force reaction surface.

15. The acoustic dipole waveform generator of claim 3, wherein the first force reaction member comprises a pair of first force reaction surfaces and wherein each of the first pair of the actuator elements is hingingly secured to a respective said first force reaction surface; wherein at least one said reaction surface is part of or integral with a force pre-compression member the position of which relative to an associated one of the actuator elements is adjustable so as to adjust a compressive force acting on the associated one of the actuator elements.

16. The acoustic dipole waveform generator of claim 1, wherein the cross-section of the at least one piston member is constant along the length of the at least one piston member.

17. The acoustic dipole waveform generator of claim 1, wherein the cross-section of the at least one piston member is non-constant along the length of the at least one piston member.

18. The acoustic dipole waveform generator of claim 1, wherein the cross-section of the at least one piston member is non-constant along the length of the at least one piston member; and wherein the cross-section of the at least one piston member reduces towards the mid-point of the length of the at least one piston member, whereby to define at least a first pair of mutually skewed piston surfaces to which the first pair of the actuator elements are respectively secured.

19. The acoustic dipole waveform generator of claim 18, wherein the one or more constraint members includes a pair of mutually spaced apart rigid arms that are each hingingly secured respectively to the at least one piston member and the second force reaction member, whereby to limit movement of the at least one piston member to a direction perpendicular to the elongate axis of the acoustic waveform generator; and wherein the at least one piston member additionally defines a second pair of mutually skewed piston surfaces to which the second pair of the actuator elements are respectively secured.

20. The acoustic dipole waveform generator of claim 1, wherein the hollow housing comprises a respective window adjacent each piston head, each of said windows being closed by a flexible or moveable closure that prevents the passage of fluid while permitting transmission of a pressure waveform caused by movement of the at least one piston member inside the hollow housing.

21. The acoustic dipole waveform generator of claim 1, wherein the hollow housing is fluid-tight and defines an internal space containing an oil in which the at least one piston member is moveable inside the hollow housing.

22. The acoustic dipole waveform generator of claim 1, when constituted as or forming part of a downhole logging tool or toolstring.

23. The acoustic dipole waveform generator of claim 3, comprising operatively connected thereto a driver that is capable of energizing at least the first pair of the actuator elements such that one of them extends along a length change axis and the other contracts along a length change axis in order to cause amplified movement of the at least one piston member in a direction perpendicular to the elongate axis of the acoustic waveform generator.

24. The acoustic dipole waveform generator of claim 3, comprising operatively connected thereto a driver that is capable of energizing at least the first pair of the actuator elements such that one of them extends along a length change axis and the other contracts along a length change axis in order to cause amplified movement of the at least one piston member in a direction perpendicular to the elongate axis of the acoustic waveform generator, wherein the driver includes an electrical circuit that is electrically connected to each pair of the actuator elements and is capable of generating electrical signals that energize at least the first pair of the actuator elements.

25. The acoustic dipole waveform generator of claim 1, wherein the natural frequency of which is approximately 1.6 kHz.

26. A method of generating a dipole waveform in a fluid, the method comprising the steps of:
    immersing the acoustic dipole waveform generator according to claim 1 in the fluid;
    causing a differential change in length, along a length change axis, of at least a first of the actuator element, thereby causing movement of the at least one piston member in a direction perpendicular to the elongate axis of the acoustic waveform generator and generating a dipole pressure waveform in the fluid.

27. The method of claim 26, wherein the acoustic dipole waveform generator comprises a first pair of the actuator elements defining mutually non-aligned length change axes and extending from the said first force reaction member towards the at least one piston member, the at least one piston member being hingingly secured to the first pair of the actuator elements; and wherein causing the differential change comprises the steps of:
    causing contraction, along said length change axis, of one of at least the first pair of the actuator elements; and
    simultaneously causing extension, along said length change axis, of the other of the at least one first pair of the actuator elements.

28. The method of claim 27, comprising the further step of, before immersing the acoustic dipole waveform generator, applying a compressive preload to each of the actuator elements.

29. A method of acquiring log data on a subterranean formation comprising the steps of:
    inserting the acoustic dipole waveform generator according to claim 1 into a fluid-filled cavity in the subterranean formation;
    operating the dipole acoustic waveform generator to generate a dipole pressure wave in the fluid filling the cavity such that the pressure wave permeates the formation; and
    at a location remote from the dipole acoustic waveform generator, operating two or more sensors of pressure energy to generate one or more log signals characteristic of the pressure wave after the pressure wave has permeated the formation.

30. The method of claim 29, comprising the step of causing the two or more sensors to be aligned in the plane of the dipole source.

31. The method of claim 29, wherein the cavity comprises a borehole formed in the formation.

32. The method of claim 29, comprising the further step of processing the log signals into a geological log in numerical, tabular, database, graphical, or image log form.

33. The method of claim 29, wherein the log signals comprise one or more electrical, optical, and/or acoustic signals.

* * * * *